United States Patent
Sun et al.

(10) Patent No.: US 11,096,170 B2
(45) Date of Patent: Aug. 17, 2021

(54) MULTI-COMPONENT INTERLEAVER DESIGN SUPPORTING CORESETS OF DIFFERENT SYMBOL LENGTH

(71) Applicant: QUALCOMM Incorporated, San Diego, CA (US)

(72) Inventors: Jing Sun, San Diego, CA (US); Heechoon Lee, San Diego, CA (US); Tao Luo, San Diego, CA (US); Makesh Pravin John Wilson, San Diego, CA (US); Yang Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/987,630

(22) Filed: May 23, 2018

(65) Prior Publication Data
US 2018/0359755 A1    Dec. 13, 2018

Related U.S. Application Data

(60) Provisional application No. 62/557,126, filed on Sep. 11, 2017, provisional application No. 62/542,839, (Continued)

(51) Int. Cl.
*H04W 72/04*    (2009.01)
*H04L 5/00*    (2006.01)
(Continued)

(52) U.S. Cl.
CPC ....... *H04W 72/0453* (2013.01); *H04L 5/0053* (2013.01); *H04L 27/26* (2013.01);
(Continued)

(58) Field of Classification Search
CPC ........... H04W 72/0446; H04W 72/042; H04W 72/0453; H04W 72/0406; H04W 48/12;
(Continued)

(56) References Cited

U.S. PATENT DOCUMENTS

2018/0227156 A1* 8/2018 Papasakellariou ........................... H04W 72/0453
2018/0368116 A1* 12/2018 Liao ....................... H04W 76/27
(Continued)

OTHER PUBLICATIONS

Huawei et al., "Discussion on NR-PDCCH Structure", 3GPP Draft; R1-1704204, 3rd Generation Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017 Apr. 2, 2017, XP051242356, Retrieved from the Internet: URL:http://www.3gpp.org/ftp/Meetings_3GPP_SYNC/RAN1/Docs/ [retrieved on Apr. 2, 2017], 4 pages.
(Continued)

*Primary Examiner* — Yemane Mesfin
*Assistant Examiner* — Mon Cheri S Davenport
(74) *Attorney, Agent, or Firm* — Norton Rose Fulbright LLP

(57) ABSTRACT

Systems and methods herein increase the throughput and decreases the collisions of transmitted resource element group (REG) bundles. Prior to transmitting a PDCCH comprising REG bundles, one or more processors perform a multi-component interleaver process that diversifies and randomizes the sequence of the REG bundles while also supporting CORESETs having different symbol lengths. In embodiments, the multi-component interleaver diversifies a virtual sequence of REG bundles using a block interleaver and then uses a randomizer interleaver to randomize the output sequence of the block interleaver. The diversified and randomized output sequence of REG bundles may be the physical channel sequenced of the REG bundles. The physi-
(Continued)

cal channel sequence of REG bundles is diversified and randomized such that the physical sequence increases throughput and decreases the collisions of transmitted REG bundles. Other aspects are claimed and described.

24 Claims, 20 Drawing Sheets

Related U.S. Application Data filed on Aug. 9, 2017, provisional application No. 62/518,477, filed on Jun. 12, 2017.

(51) Int. Cl.
*H04L 27/26* (2006.01)
*H04L 1/00* (2006.01)

(52) U.S. Cl.
CPC .......... *H04L 1/0071* (2013.01); *H04L 5/0007* (2013.01); *H04L 5/0023* (2013.01); *H04L 5/0094* (2013.01); *H04W 72/042* (2013.01)

(58) Field of Classification Search
CPC . H04W 72/04; H04W 72/1289; H04W 76/10; H04W 76/11; H04W 76/28; H04W 28/02; H04W 52/0219; H04W 72/1263; H04W 74/006; H04L 5/0053; H04L 5/0048; H04L 5/0094; H04L 1/1861; H04L 1/0071; H04L 1/1812; H04L 27/26; H04L 5/0007; H04L 5/001; H04L 5/0023; H04L 5/0055; H04J 11/0069; H04J 11/0073; H04J 11/0076
See application file for complete search history.

(56) References Cited

U.S. PATENT DOCUMENTS

2019/0037540 A1* 1/2019 Seo ...................... H04B 7/0617
2019/0103941 A1* 4/2019 Seo ........................... H04L 1/00
2020/0007295 A1* 1/2020 Kwak ................... H04L 5/0007

OTHER PUBLICATIONS

Intel Corporation: "Evaluations of distributed NR-PDCCH transmission," 3GPP Draft; R1-1707376 Evaluations of Distributed NR-PDCCH Transmission Final, 3rd Generation Partnership Project (3GPP), Mobile Competence Centre; 650, Route Des Lucioles; F-06921 Sophia-Antipolis, vol. RAN WG1, No. Hangzhou; May 15, 2017-May 19, 2017, May 14, 2017 (May 14, 2017), XP051272588, 12 pgs, Retrieved from the Internet: URL: http://www.3gpp.org/ftp/Meetings_3GPP_SYNC/RAN1/Docs/ [retrieved on May 14, 2017].
International Search Report and Written Opinion—PCT/US2018/034379—ISA/EPO—dated Nov. 23, 2018.
Qualcomm Incorporated: "Remaining open issues on PDCCH structure," 3GPP Draft; R1-1716413_PDCCH Structure, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017 (Sep. 17, 2017), XP051339868, 4 pages, Retrieved from the Internet: URL: http://www.3gpp.org/ftp/Meetings_3GPP_SYNC/RAN1/Docs/ [retrieved on Sep. 17, 2017].

* cited by examiner

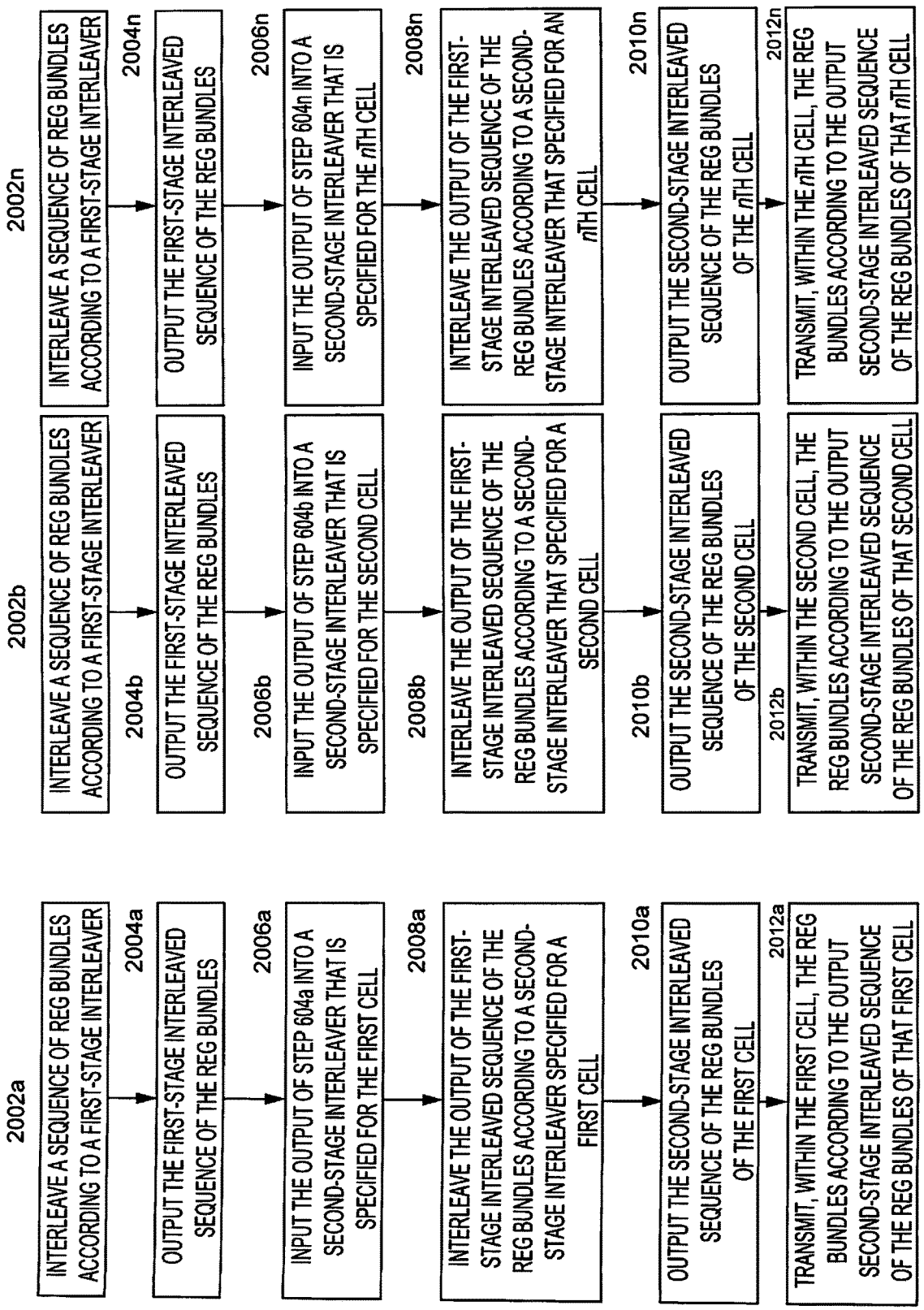

MULTI-COMPONENT INTERLEAVER DESIGN SUPPORTING CORESETS OF DIFFERENT SYMBOL LENGTH

CROSS-REFERENCE TO RELATED APPLICATIONS

This application claims priority to and the benefit of U.S. Provisional Patent Application No. 62/518,477 entitled, "MULTI-COMPONENT INTERLEAVER DESIGN FOR DISTRIBUTED PDCCH FOR NR," filed on Jun. 12, 2017 (174806P1); U.S. Provisional Patent Application No. 62/542,839, entitled, "RESOURCE ELEMENT GROUP BUNDLE INTERLEAVER DESIGN TO SUPPORT EFFICIENT CORESET OVERLAPPING," filed on Aug. 9, 2017 (175426P1); U.S. Provisional Patent Application No. 62/557,126, entitled, "TWO STEP INTERLEAVER DESIGN FOR EFFICIENT CORESET OVERLAPPING," filed on Sep. 11, 2017 (176462P1). All of said applications are hereby incorporated by reference herein in their entireties as if fully set forth below and for all applicable purposes.

TECHNICAL FIELD

Aspects of the present disclosure relate generally to wireless communication systems, and more particularly, to organizing information within a wireless communication. Certain embodiments of the technology discussed below involve a multi-step resource element group (REG) bundle interleaver design for mapping REGs to control channel elements (CCEs) to support control resource sets (CORESETs) of different symbol length.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an evolved Node B (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio BS (NR NB), a network node, 5G NB, eNB, a Next Generation NB (gNB), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communications, includes determining, by a processor, a plurality of mappings of control channel elements (CCEs) to resource element groups (REGs) and a plurality of mappings of the REGs to physical resources for a plurality of control resource sets (CORESETs) having different symbol lengths. For example, a method may include performing, within each CORESET, multi-component interleaving on a virtual sequence of REG bundles. Further, the multi-component interleaving includes a diversity component and a randomization component. Further still, the performing maps the virtual sequence of the REG bundles to a physical sequence of the physical resources. Moreover, the method may include transmitting, by one or more antenna, a plurality of downlink control information (DCI) transmissions based on the determined plurality of mappings.

In an additional aspect of the disclosure, a non-transitory computer-readable medium having program code recorded thereon, which when executed causes a processor to perform wireless communication operations may include code for determining plurality of mappings of control channel elements (CCEs) to resource element groups (REGs) and a plurality of mappings of the REGs to physical resources for a plurality of control resource sets (CORESETs) having different symbol lengths. Further, within each CORESET, the program code may include program code for performing multi-component interleaving on a virtual sequence of REG bundles. For example, the multi-component interleaving includes a diversity component and a randomization component. Moreover, the code for performing may map the virtual sequence of the REG bundles to a physical sequence of the physical resources. Further, the program code may include program code for transmitting a plurality of downlink control information (DCI) transmissions based on the determined plurality of mappings.

In an additional aspect of the disclosure, a system for wireless communications, may include means for determining a plurality of mappings of control channel elements (CCEs) to resource element groups (REGs) and a plurality of mappings of the REGs to physical resources for a plurality of control resource sets (CORESETs) means for having different symbol lengths. For example, within each CORESET, a system may include means for performing multi-component interleaving on a virtual sequence of REG bundles. Further, the multi-component interleaving may include a diversity component and a randomization component. For example, the means for performing may map the virtual sequence of the REG bundles to a physical sequence of the physical resources. Further, a system may include means for transmitting a plurality of downlink control information (DCI) transmissions based on the determined plurality of mappings.

In an additional aspect of the disclosure, a system for wireless communications, includes a processor that determines a plurality of mapping of control channel elements (CCEs) to resource element groups (REGs) and a plurality of mapping of the REGs to physical resources for a plurality of control resource sets (CORESETs) has different symbol lengths. For example, within each CORESET, the processor may perform multi-component interleaves on a virtual sequence of REG bundles. Furthermore, the multi-component interleaves comprises a diversity component and a randomization component. Further still, the performing may map the virtual sequence of the REG bundles to a physical sequence of the physical resources. Yet further, one or more antenna may transmit a plurality of downlink control information (DCI) transmissions based on the determined plurality of mapping.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention may include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 20 is an example process according to some embodiments of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
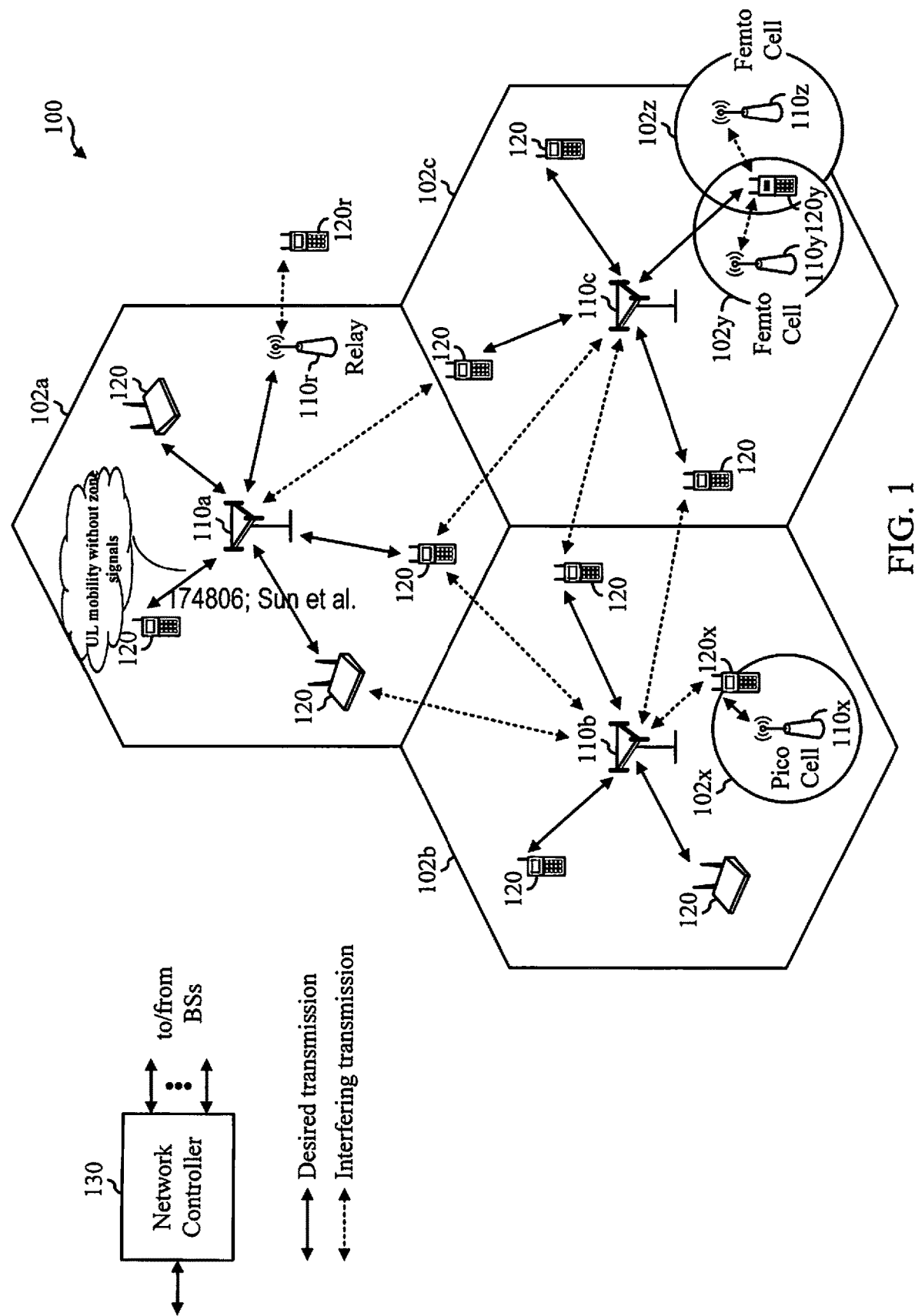
FIG. 1 is a block diagram, illustrating details of a wireless communication system according to some embodiments of the present disclosure.

Aspects of the present disclosure provide apparatus, methods, processing systems, and computer readable mediums for wireless communications, for example, new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects provide techniques and apparatus for resource element group (REG) bundle interleaver design. Implementations of the technology enable mapping of REGs to control channel elements (CCEs) to support control resource set (CORESET) overlapping in communication systems (e.g., those operating according to NR technologies). Aspects provide a multi-step (e.g., a two-step) interleaver design for efficient overlapping CORESET. A first step can include permuting REG bundles in a segment of REG bundles to produced interleaved blocks (e.g., groups) of REG bundles. REG bundles from a same CCE can be arranged in different interleaved blocks. In a second step of interleaving, interleaved blocks can be interleaved across the entire CORESET. And REG bundles of the same CCE can be arranged in the different blocks and may end up far apart. These arrangements and others discussed herein can improve frequency diversity.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure may be applied in other generation-based communication systems, such as 5G and later, including NR technologies.

Example Wireless Communications System

FIG. 1 illustrates an example wireless network 100, such as a new radio (NR) or 5G network. Aspects of the present disclosure may be implemented or performed, for example, for efficiently supporting coexistence of CORESETs of different (symbol) lengths, as described in greater detail below. For example, a BS 110 and UE 120 may determine a mapping of control channel elements (CCE) to resource element groups (REGs) and REGs to physical resources for a plurality of control resource sets (CORESETs). The mappings can be done according to an interleaver design that may be a two step interleaver design. In other scenarios, the mappings may involve other numbers of steps arranged in a desired ordering.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" may refer to a coverage area of a Node B and/or a NB subsystem serving this coverage area, depending on the context in which the term is used. In NR systems, the term "cell" and evolved NB (eNB), NB, 5G NB, Next Generation NB (gNB), access point (AP), BS, NR BS, 5G BS, or transmission reception point (TRP) may be interchangeable.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, solar panel or array system, implantables, wearables, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) or narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, sub-bands, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with any wireless technology for example LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 2:
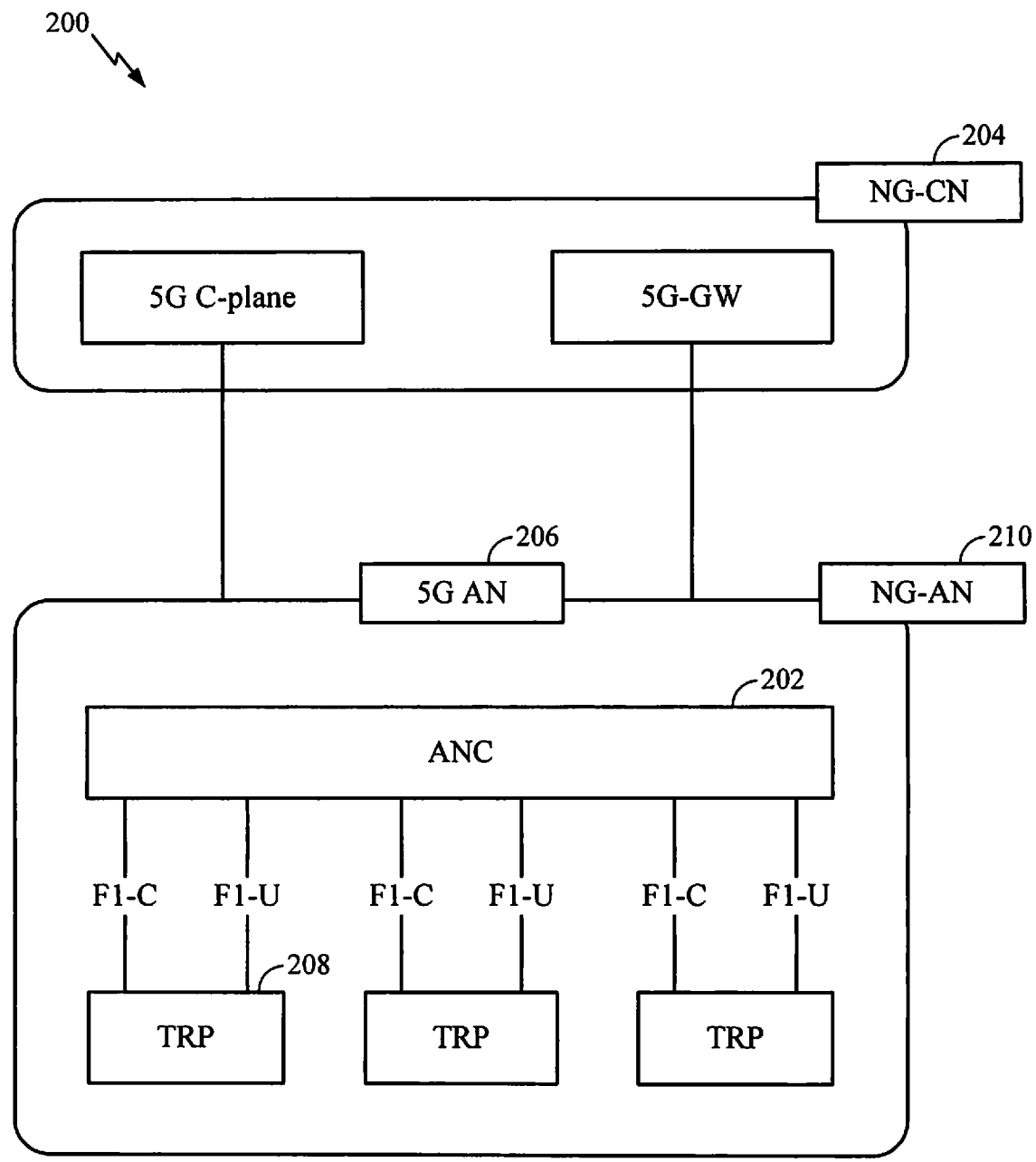
FIG. 2 is a block diagram, illustrating details of a wireless communication system according to some embodiments of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208. As described above, a TRP may be used interchangeably with "cell".

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP 208 may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may not be present.

The logical architecture may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). A BS may include a central unit (CU) (e.g., ANC 202) and/or one or more distributed units (e.g., one or more TRPs 208).

Figure 3:
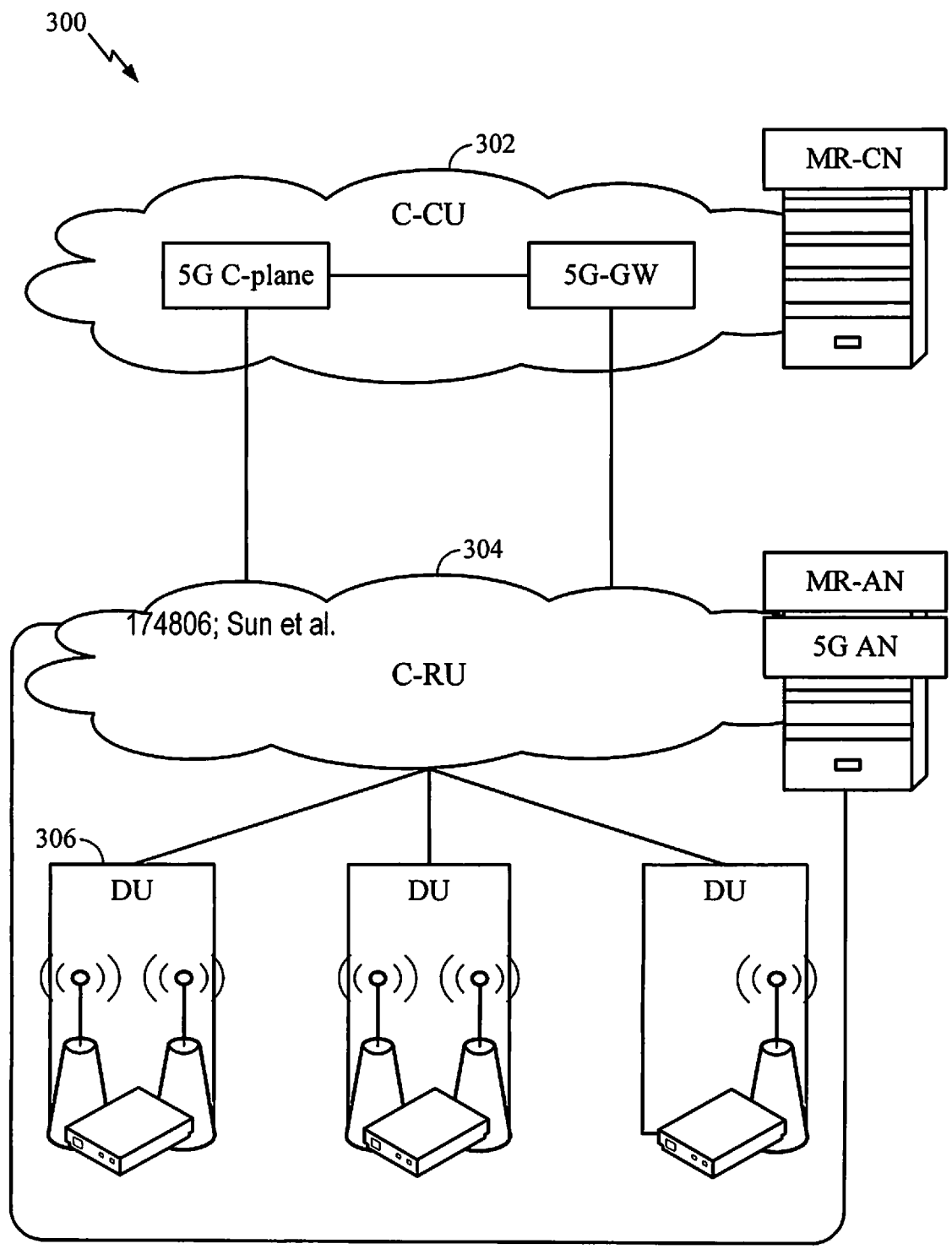
FIG. 3 is a block diagram, illustrating details of a wireless communication system according to some embodiments of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity. A centralized RAN unit (C-RU) 304 may host one or more ANC functions. The C-RU 304 may host core network functions locally. The C-RU 304 may have distributed deployment. The C-RU 304 may be close to the network edge. A DU 306 may host one or more TRPs. The DU 306 may be located at edges of the network with radio frequency (RF) functionality.

Figure 4:
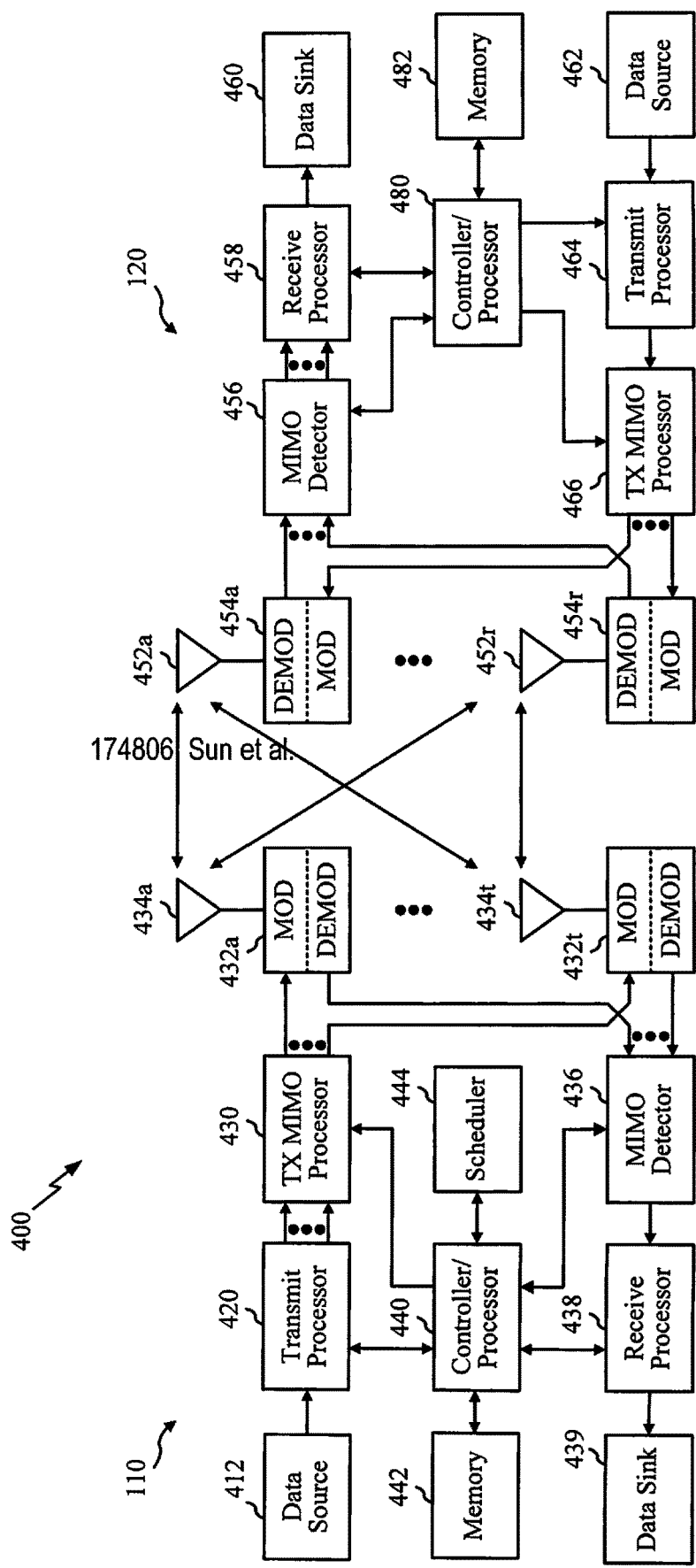
FIG. 4 is a block diagram, illustrating details of a wireless communication system according to some embodiments of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 10, 11, 14, and 15.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 10, 11, 14, 15, 19, and 20 and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
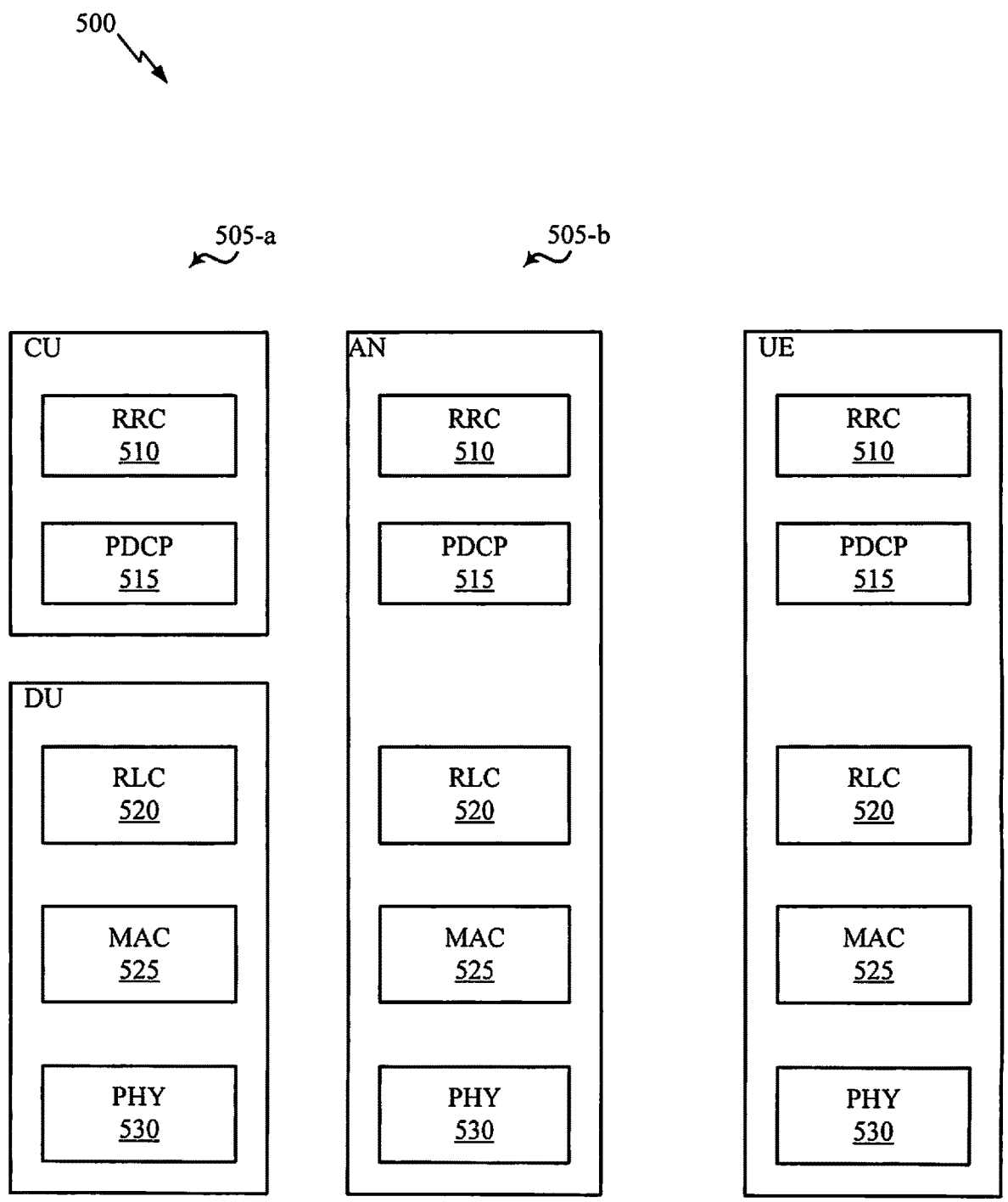
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

A UE may operate in various radio resource configurations. These may include a configuration associated with transmitting pilots using a dedicated set of resources (e.g., a radio resource control (RRC) dedicated state, etc.). Also these can include configurations associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as ANs, CUs, DUs and/or UEs, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 6:
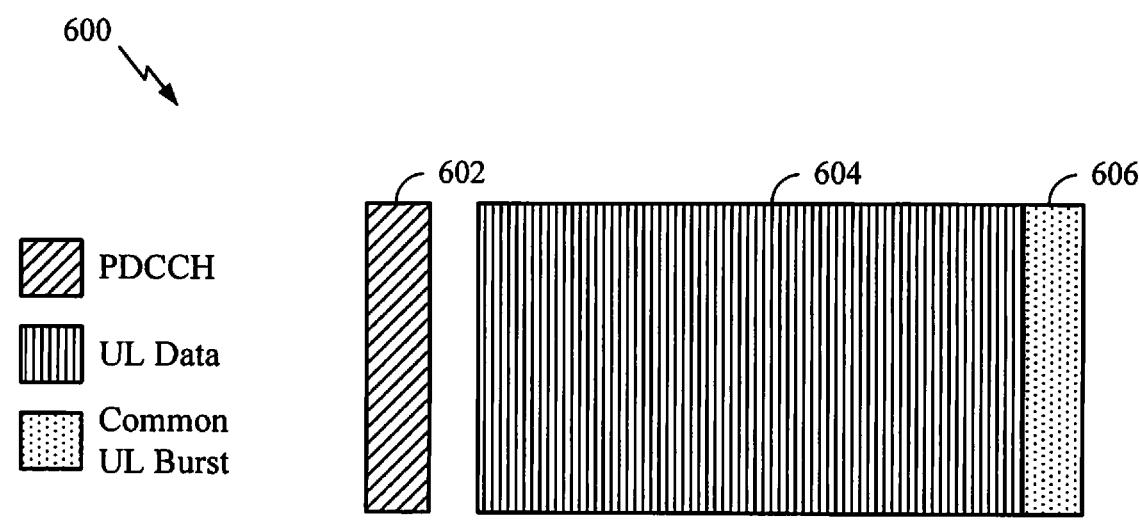
FIG. 6 illustrates an example of an uplink-centric subframe, in accordance with certain aspects of the present disclosure.

FIG. 6 is a diagram showing an example of an UL-centric subframe 600. The UL-centric subframe 600 may include a control portion 602. The control portion 602 may exist in the initial or beginning portion of the UL-centric subframe 600. The UL-centric subframe 600 may also include an UL data portion 604. The UL data portion 604 may be referred to as the payload of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel PDCCH.

As illustrated in FIG. 6, the end of the control portion 602 may be separated in time from the beginning of the UL data portion 604. This time separation may be referred to as a gap, guard period, guard interval, and/or various other suitable terms. This separation provides time for a switch between (to or form or over) from DL communication (e.g., reception operation by the scheduling entity) to UL communication (e.g., transmission by the scheduling entity). The UL-centric subframe 600 may also include a common UL portion 606. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

Figure 7:
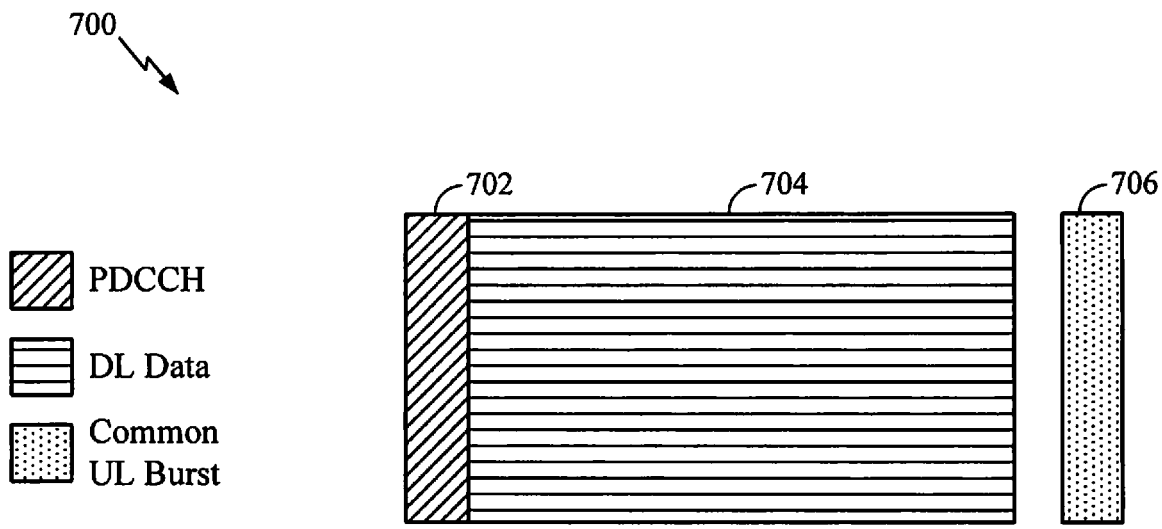
FIG. 7 illustrates an example of a downlink-centric subframe, in accordance with certain aspects of the present disclosure.

FIG. 7 is a diagram showing an example of a DL-centric subframe 700 (e.g., also referred to as a slot). The DL-centric subframe 700 may include a control portion 702. The control portion 702 may exist in the initial or beginning portion of the DL-centric subframe. The control portion 702 may include various scheduling information and/or control information corresponding to various portions of the DL-centric subframe 700. In some configurations, the control portion 702 may be a physical DL control channel (PDCCH), as indicated in FIG. 7. The DL-centric subframe 700 may also include a DL data portion 704. The DL data portion 704 may be referred to as the payload of the DL-centric subframe 700. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe 700 may also include a common UL portion 706. The common UL portion 706 may sometimes be referred to as an UL burst, a common UL burst, and/or various other suitable terms. The common UL portion 706 may include feedback information corresponding to various other portions of the DL-centric subframe 700. For example, the common UL portion 706 may include feedback information corresponding to the control portion 702. Non-limiting examples of feedback information may include an ACK signal, a NACK signal, a HARQ indicator, and/or various other suitable types of information. The common UL portion 706 may include additional or alternative information, such as information pertaining to random access channel (RACH) procedures, scheduling requests (SRs), and various other suitable types of information. As illustrated in FIG. 7, the end of the DL data portion 704 may be separated in time from the beginning of the common UL portion 706. This time separation may be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Features and techniques of the technology relate to physical channels. For example, physical downlink control channels (PDCCH) are physical channels that carry, among other things, downlink control information (DCI). A PDCCH is transmitted over a set of resource elements (RE)s in a control resource set. In embodiments, REs may be grouped into RE groups (REG)s. In an example, a REG may include twelve resource elements (RE)s. In further examples, a REG may include any number of REs. In embodiments, REGs are further grouped into control channel elements (CCE)s. In an example, a CCE may include six REGs. In further examples, a CCE may include any number of REGs. The REGs within a CCE may be further grouped into REG bundles. For example, a bundle of REGs may include two REGs, three REGs, or six REGS. In further examples, a REG bundle may include any number of REGS. The REGs in a REG bundle may be located adjacent to each other in the time-frequency domain. In further embodiments, a number of CCEs make up a PDCCH to carry a DCI. The number of CCEs in a PDCCH may be called an aggregation level (AL). For example, one CCE makes an AL level of one (AL1), two CCEs make an AL level of two (AL2), and four CCEs make an AL level of four (AL4), and/or the like.

Interleaving REG bundles of a PDCCH can be helpful. Increasing wireless communication traffic, the increasing number of base stations, and the decreasing distance between base stations has significantly increased interference problems. As such, traditional interleaving techniques have become insufficient in certain scenarios. Systems and methods herein including efficient CORESET overlapping and multi-stage interleaving of REG bundles, which provide solutions to the increasing wireless communication traffic, the increasing number of base stations, and the decreasing distance between base stations by addressing and resolving increasing complex interferences problems.

Example Resource Element Group Bundle Interleaver Design to Support Efficient Coreset Overlapping In communications systems operating according to new radio (NR) (e.g., 5G) standards, one or more control resource sets (CORESETs) for transmission of control information, such as downlink control information (DCI), which may be carried on the physical downlink control channel (PDCCH), may be supported. A CORESET may include one or more control resources (e.g., time and frequency resources) configured for conveying the control information. Within each CORESET, one or more search spaces (e.g., common search space, UE-specific search space, etc.) may be defined for a given UE.

A CORESET may be defined in units of resource element groups (REGs). Each REG may include a fixed number (e.g., twelve, or some other number) of tones in one symbol period (e.g., a symbol period of a slot). One tone in one symbol period is referred to as a resource element (RE). A fixed number of REGs may be included in a control channel element (CCE) (e.g., a CCE may include six REGs). Sets of CCEs may be used to transmit NR-PDCCH, with different numbers of CCEs in the sets used to transmit NR-PDCCH using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Figure 8:
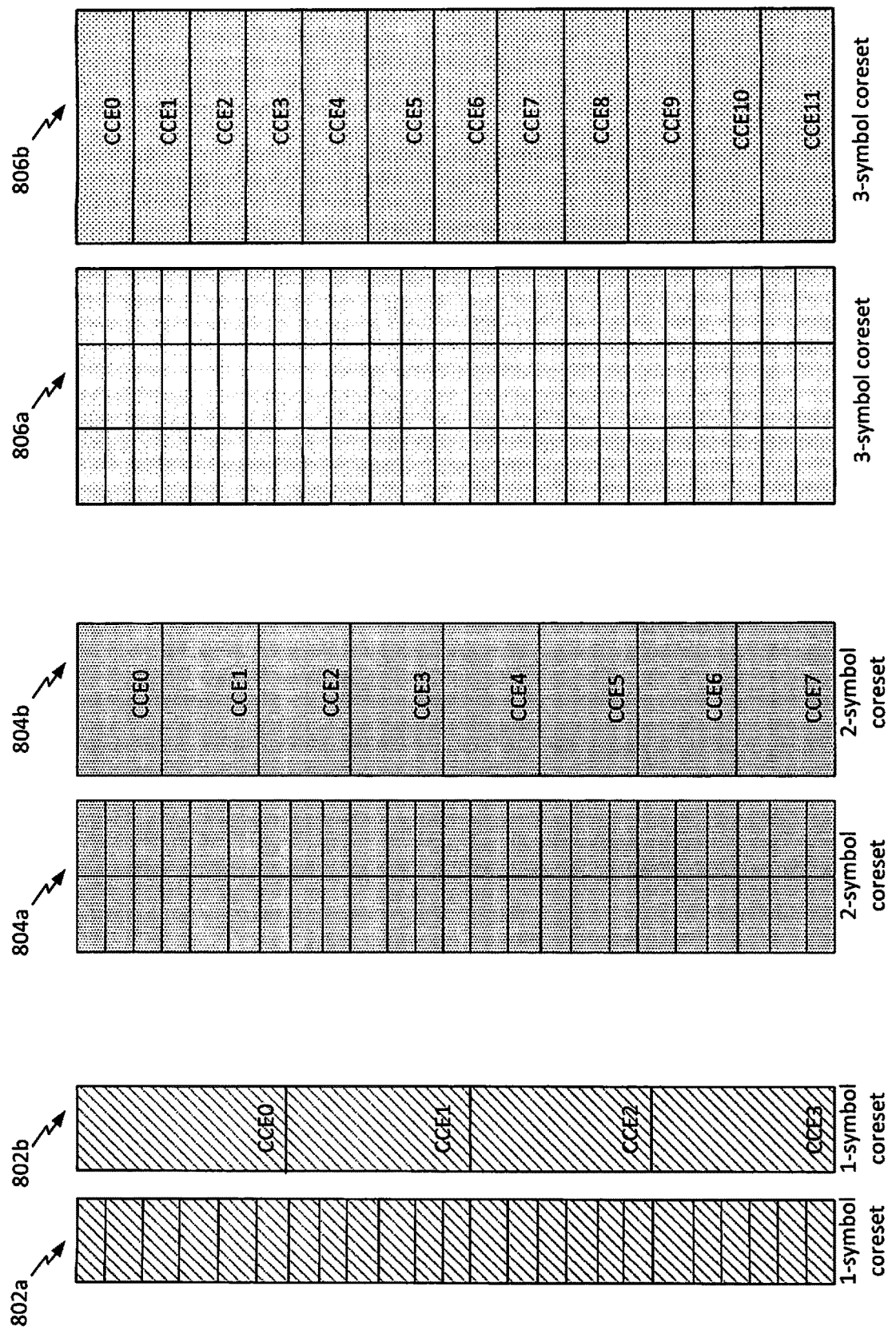
FIG. 8 illustrates an example of overlapping control resource sets (CORESETs) having different symbol lengths, in accordance with certain aspects of the present disclosure.

In certain aspects, a next generation Node B (e.g., a 'g' Node B or 'gNB') (e.g., in communication systems that support NR) may support CORESETs of different lengths that span multiple symbol periods (e.g., OFDM symbol periods). That is, the control channel candidates may be mapped to a single OFDM or multiple (e.g., two, three, etc.) OFDM symbols. FIG. 8 illustrates examples of CORESETs 802, 804, and 806 that span one, two and three symbols, respectively, according to certain aspects of the present disclosure. As shown, assuming control channel region spanning three OFDM symbols (e.g., symbol 0, symbol 1 and symbol 2), a one symbol CORESET 802 may be defined, a two symbol CORESET 804 may be defined, and a three symbol CORESET 806 may be defined.

As shown in FIG. 8, the CORESETs may be associated with different aggregation levels. As shown in FIG. 8, 1-symbol CORESET 802a may have a mapping of 6 REGs (REG bundle) to a CCE, as shown in CORESET 802b (although not shown, CORESET 802a may have mapping of 2 REGS to a CCE). 2-symbol CORESET 804a may have a mapping of 3 REGs to a CCE, as shown in CORESET 804b (although not shown, CORESET 804a may have mapping of 1 REGS to a CCE). 3-symbol CORESET 806a may have a mapping of 2 REGs to a CCE, as shown in CORESET 806b (although not shown, CORESET 806a may have mapping of 2 REGS to a CCE).

As shown in FIG. 8, the CORESETs do not use any interleaving of the REGs. In some aspects, a NodeB may use different techniques of forming CCEs from REGs and mapping NR-PDCCHs to CCEs for different UEs. For example, in one aspect, a frequency first mapping may be used. In another aspect, a time first mapping may be used. For time first CORESET mapping, there may be one, two or three OFDM symbols in the time domain, and in the frequency domain, both localized and interleaved CCE to REG mapping may be supported. The interleaved mode may be achieved by using an interleaver at the REG bundle level. The size of REG bundle (in the frequency domain) may depend on the CORESET length (e.g., the number of symbols that the CORESET spans). For example, for a one symbol CORESET, a two or six REG bundle size may be supported; for a two symbol CORESET, a one or three REG bundle size may be supported; and for a three symbol CORESET, a one or two REG bundle size may be supported.

Figure 9:
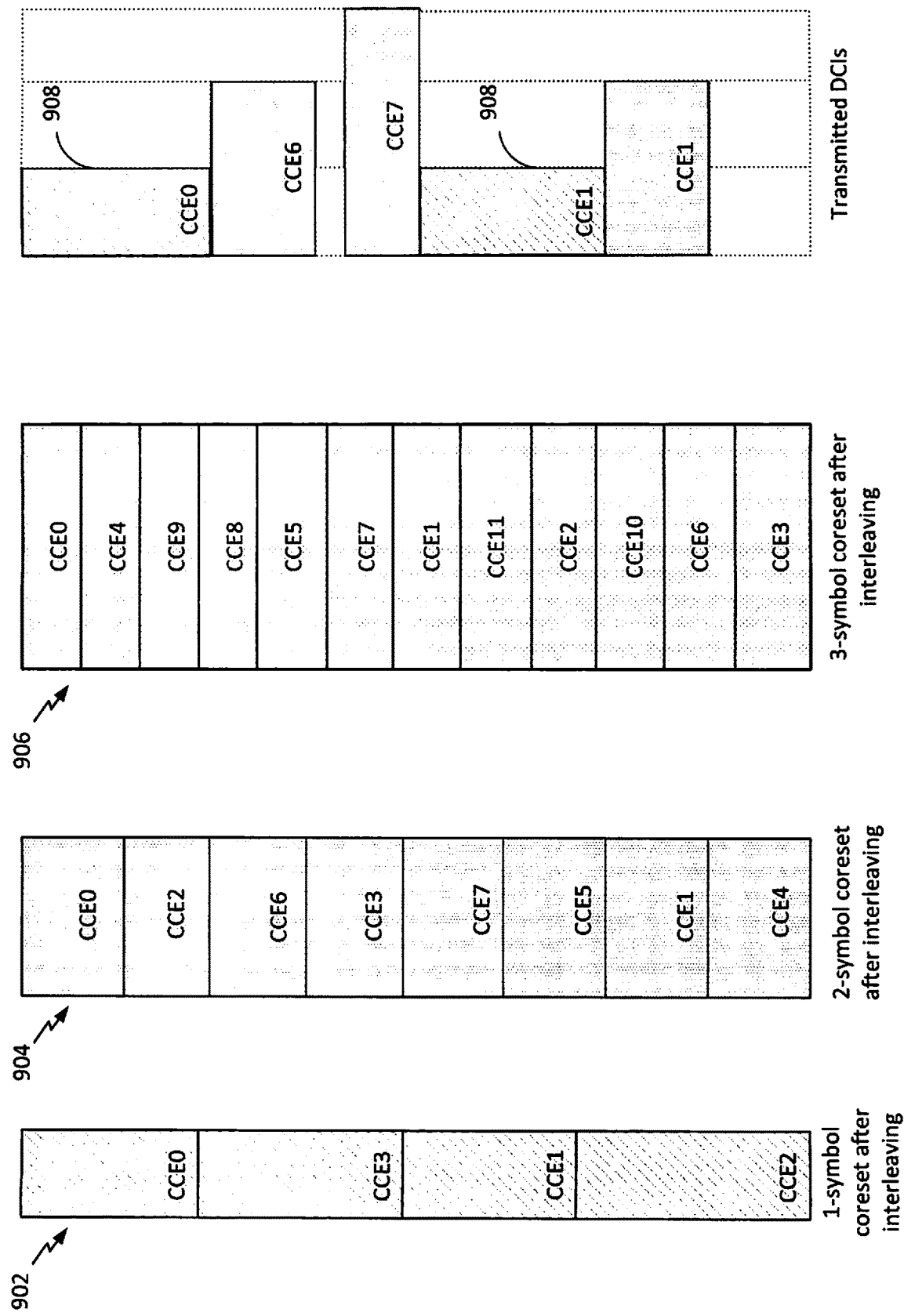
FIG. 9 illustrates an example of blocking for the overlapping CORESETs illustrated in FIG. 8 after random interleaving, in accordance with certain aspects of the present disclosure.

Although not shown in FIG. 8 or 9, the three CORESETs may be overlapping CORESETs. For example, the CORESETs may start at the same symbol. In some aspects, the base station (e.g., NodeB, gNB, etc.) may overlap CORESETs having different lengths. For example, in some cases, it may be beneficial for the base station to be able to send grants using different CORESET lengths at the same time to different UEs and/or to the same UE. As one example, a three symbol CORESET may be more desirable for cell edge UEs, which may need more resources (e.g., in the control region) to robustly decode control messages from the base station. In another example, a single symbol CORESET may be sufficient for cell center UEs, as such UEs may have a high (or above a threshold) signal to noise ratio (SNR).

While supporting the coexistence of CORESETs of different lengths may provide the base station with flexibility in allocating control resources, doing so may lead to blocking situations in which one or more control channel resources become unusable. For example, referring to FIG. 9, assume that the 1-symbol CORESET 902, 2-symbol CORESET 904, and 3-symbol CORESET 906, each with the same bandwidth, are configured. Due in part to the time first CCE to REG mapping, if a REG is used in a control message (including DCI) transmission in the 1-symbol CORESET 902, the later REGs in the same resource block (but later OFDM symbol) may not be used for the control message transmission in the 2-symbol CORESET 904 or 3-symbol CORESET 906. As used herein, such a situation may be referred to as a "blocking" event.

As shown in FIG. 9, a random CCE interleaving may be used for the 1-symbol CORESET 902, 2-symbol CORESET 904, and 3-symbol CORESET 906. The interleaving is at the REG bundle level for each CORESET. The interleaving is pseudo-random as a function of time (e.g., system frame number (SFN) and slot index), cell ID, and a gNB specified random seed. Although different overlapping CORESETs may have the same bandwidth (e.g., same number of RBs), the size of the REG bundles may be different for different CORESETs and, thus, the number of REG bundles is different and the possible interleaving is different for the CORESETs. Since REG bundles of one CORESET may be interleaved independently from the REG bundles of another CORESET with different length, a DCI in the first CORESET may "block" multiple DCI in another CORESET.

In some aspects, a DCI with AL x (where x) may start from a CCE with an index that is divisible by x. As shown in FIG. 9, a DCI in a CCE in the 1-symbol CORESET 902 may "block" six consecutive RBs, may "block" two symbol CCEs and three symbol CCEs of the overlapping CORESET 904 and 906. For example, one aggregation level (AL) 1 DCI in the 1-symbol CORESET 902 may "block" two AL 1 DCIs in the 2-symbol CORESET 904 or one AL2/AL4/AL8 DCI in the 2-symbol CORESET 904. The AL1 DCI in the 1-symbol CORESET 902 may "block" three AL1 DCIs in 3-symbol CORESET 906, two AL2 DCI, or one AL4/AL8 DCI in the 3-symbol CORESET 906. In some cases, the DCI in RBs that are located a threshold distance away may not be blocked. As shown in FIG. 9, different aggregation levels may be used for the DCI. For example, the AL2 DCI 908 is transmitted in the 1-symbol CORESET 902 using CCE0 and CCE1. These two CCEs block all AL2 and above 2-symbol and 3-symbol CORESET DCIs, even when there is empty CCEs in the control region.

In systems that support NR, these "blocking" situations may become more typical, as BSs configure UEs to monitor different sets of resources (e.g., overlapping CORESETs). Consider one reference example where a BS configures CORESETs covering the same set of RBs but of different lengths (e.g., CORESETs with 48 RBs in frequency domain, but with 1 or 2 or 3 symbols in time domain). In such a case, the BS may configure the cell edge UE(s) to monitor the 3 symbol CORESET, cell center UE(s) to monitor the 1 symbol CORESET, and median UE(s) to monitor the 2 symbol CORESET. Further, in some cases, the BS may allow some overlapping between the CORESETs, such that the cell center UE(s) monitors both the 1 and 2 symbol CORESET. In such scenarios, it may be desirable to provide techniques that enable an apparatus (e.g., base station, such as a NodeB, gNB, etc.) to reduce the level of "blocking" between control channel transmissions across CORESETs with different OFDM symbol lengths.

Aspects of the present disclosure provide REG bundle (e.g., CCE) interleaver design for mapping of REGs to physical resources for overlapping CORESETs of different symbol lengths. In aspects, a common interleaving may be used for different CORESETs of different lengths.

Figure 10:
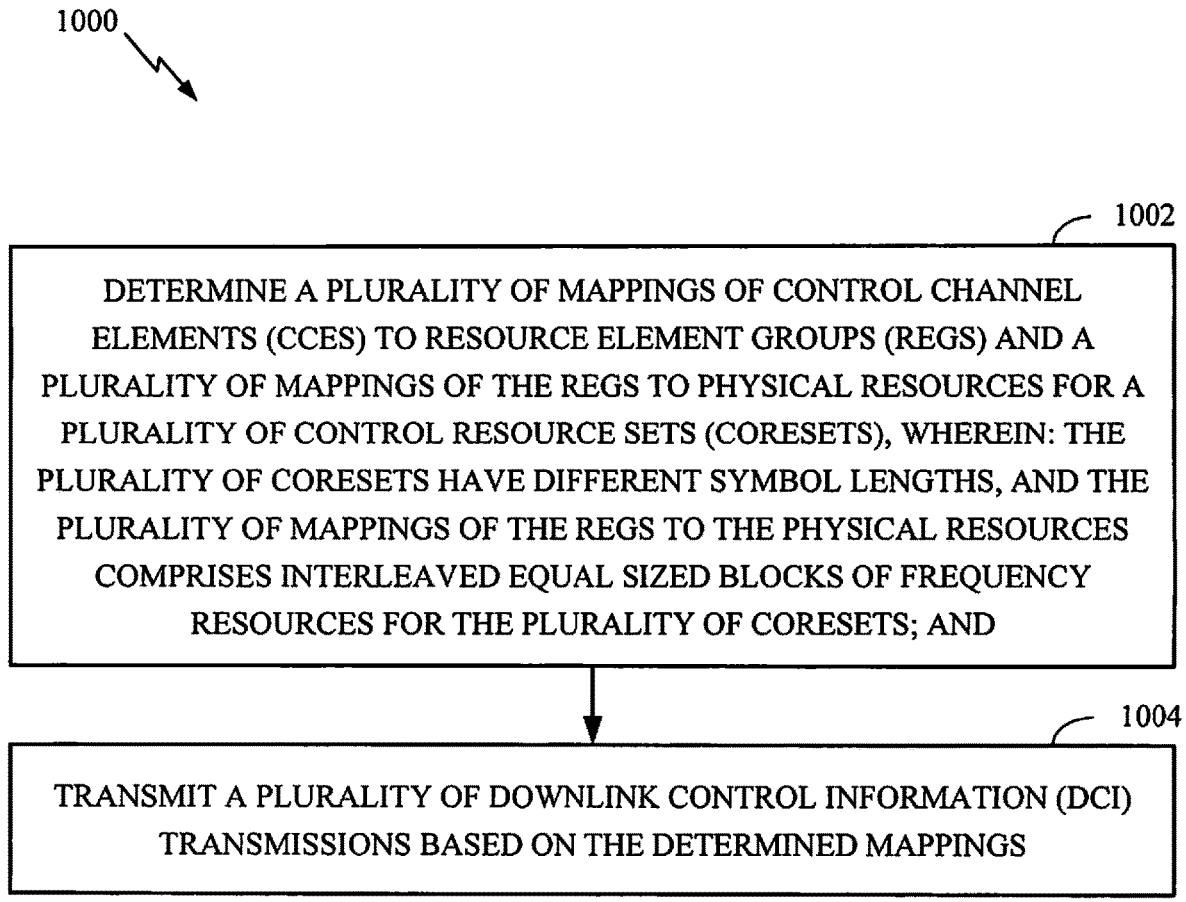
FIG. 10 is an example process according to some embodiments of the present disclosure.

FIG. 10 illustrates example operations 1000 for wireless communications, in accordance with aspects of the present disclosure. Operations 1000 may be performed by a BS, for example, BS 110, shown in FIG. 1.

Operations 1000 begin, at block 1002, by determining a plurality of mappings of CCEs to REGs and a plurality of mappings of the REGs to physical resources for a plurality of CORESETs. The plurality of CORESETs have different symbol lengths and the plurality of mappings of the REGs to the physical resources comprises interleaved equal sized blocks of frequency resources for the plurality of CORESETs. At 1004, the BS transmits (e.g., to one or multiple UEs) a plurality of DCI transmissions based on the determined mappings. The DCI transmissions may be transmitted at a same or overlapping starting symbol, but on different frequency resources. The mappings may further include interleaved CCEs within each block of interleaved frequency resources.

Figure 11:
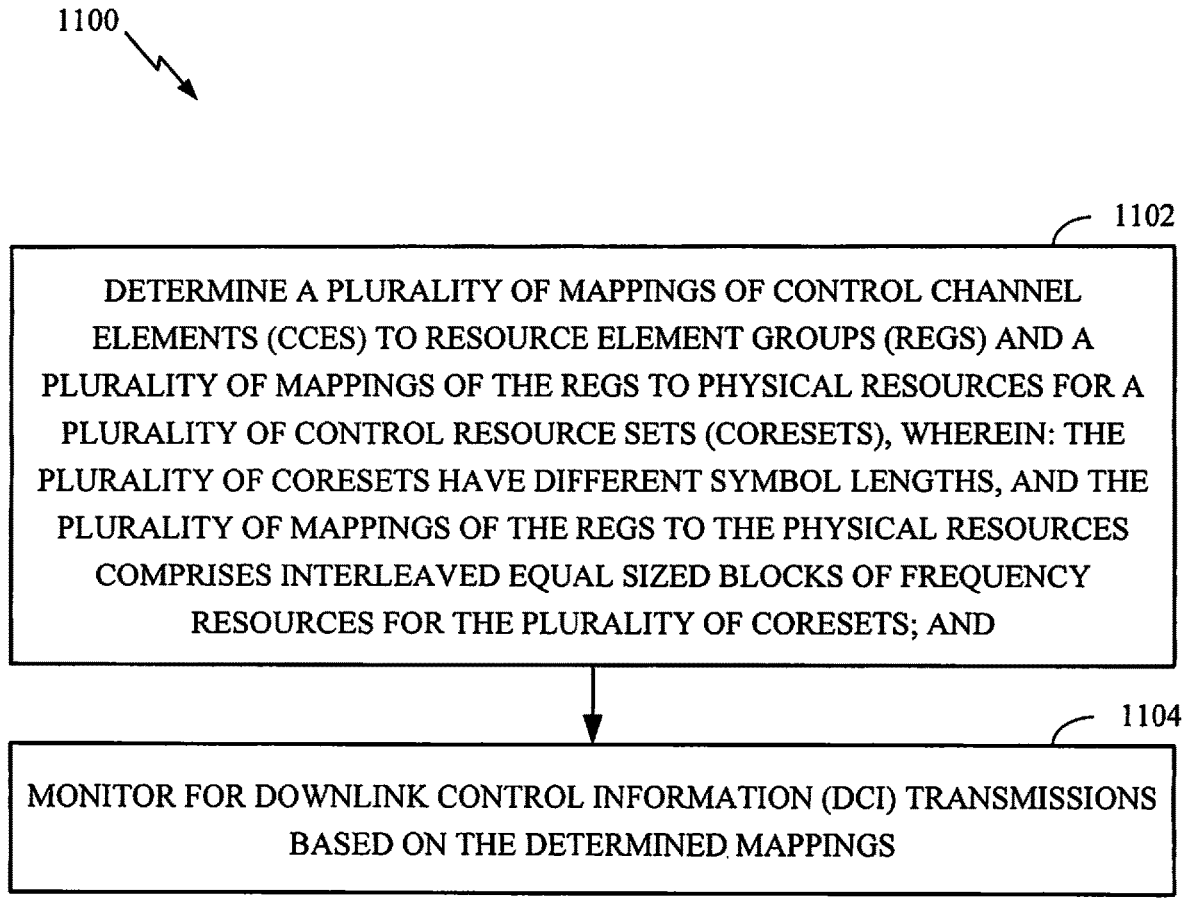
FIG. 11 is an example process according to some embodiments of the present disclosure.

FIG. 11 illustrates example operations 1100 for wireless communications, in accordance with aspects of the present disclosure. Operations 1100 may be performed by a UE, for example, UE 120, shown in FIG. 1.

Operations 1100 begin, at block 1102, by determining a plurality of mappings of CCEs to REGs and a plurality of mappings of the REGs to physical resources for a plurality of CORESETs. The plurality of CORESETs have different symbol lengths and the plurality of mappings of the REGs to the physical resources comprises interleaved equal sized blocks of frequency resources for the plurality of CORESETs. At 1104, the UE monitors for DCI transmissions based on the determined mappings.

According to certain aspects, the common interleaving for different CORESETs uses a unit of interleaving (e.g., the equal sized block of frequency resources) that is at least the least common multiple of all frequency domain bundle sizes of all overlapping CORESETs. The same interleaving is applied to all involved CORESETs (e.g., the same seed may be applied for the interleaving for all CORESETs involved).

In some cases, the configured CORESETs depends on the system bandwidth. For example, for small system bandwidth (e.g., below a threshold amount), up to 3-symbol CORESETs may be configured. For larger system bandwidth (e.g., larger than the threshold amount), up to 2-symbol CORESETs may be configured.

The unit of interleaving may be preconfigured (e.g., fixed in a technical specification) or may be configured by the gNB (e.g., based on which overlapping CORESETs are configured). The preconfigured interleaving unit may be 6 RBs. The gNB may configure the interleaving unit, for example, to be the least common multiple of the CORESETs. For example, if a 1-symbol CORESET with a size 2 REG bundle and a 3-symbol CORESET with a size 1 REG bundle are configured, the gNB may configure the interleaving unit to be size 2 (i.e., the least common multiple of 1 and 2).

Figures 12A, 12B:
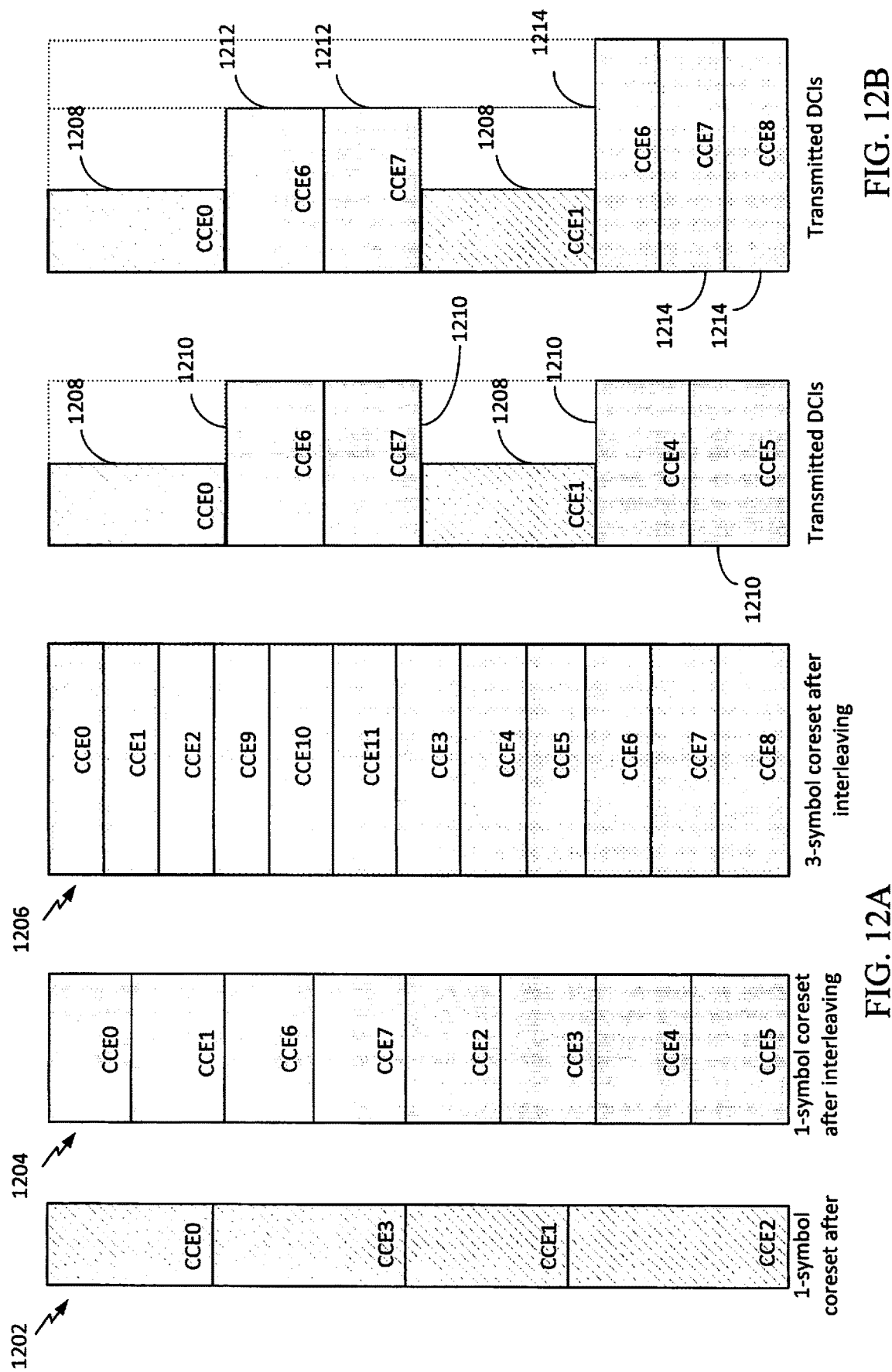
FIG. 12A illustrates an example of using equal size frequency block interleaving design for overlapping CORESETs of different lengths, in accordance with certain aspects of the present disclosure.
FIG. 12B illustrates another example of DCI transmission for the interleaving design of FIG. 12A for overlapping CORESETs of different lengths, in accordance with certain aspects of the present disclosure.

FIG. 12A illustrates an example of using equal size frequency block interleaving design for overlapping CORESETs of different lengths, in accordance with certain aspects of the present disclosure. As shown in FIG. 12A, the least common multiple of all frequency domain bundle size is the 6 RB size of the CCEs for the 1-symbol CORESET 1202. Thus, in the example interleaving design shown in FIG. 12A, equal sized blocks of 6 RBs are interleaved for the 1-symbol CORESET 1202, the 2-symbol CORESET 1204, and the 3-symbol CORESET 1206. In this case, the number of interleave units are the same (e.g., 4 interleaved units are shown in FIG. 12A), and the resulting interleaving pattern are the same.

As shown in FIG. 12A, an AL2 1-symbol DCI 1208 may be transmitted (e.g., CCE0 and CCE1 of the CORESET 1202) and an AL4 2-symbol DCI 1210 may be transmitted in the remaining RBs (e.g., CCE6, CCE7, CCE4, and CCE5 of the CORESET 1204). According to certain aspects, instead of using AL 1/2/4/8 for the 3-symbol CORESET 1206, AL 1/3/6/12 may be used which may improve packing efficiency. As shown in FIG. 12B, the AL2 1-symbol DCI 1208 may be transmitted (e.g., CCE0 and CCE1 of the CORESET 1202), in the remaining RBs an AL2 2-symbol DCI 1212 may be transmitted (e.g., in CCE6 and CCE7 of the CORESET 1204) and an AL3 3-symbol DCI 1214 may be transmitted (e.g., CCE6, CCE7, and CCE8 of the CORESET 1206).

Figure 13:
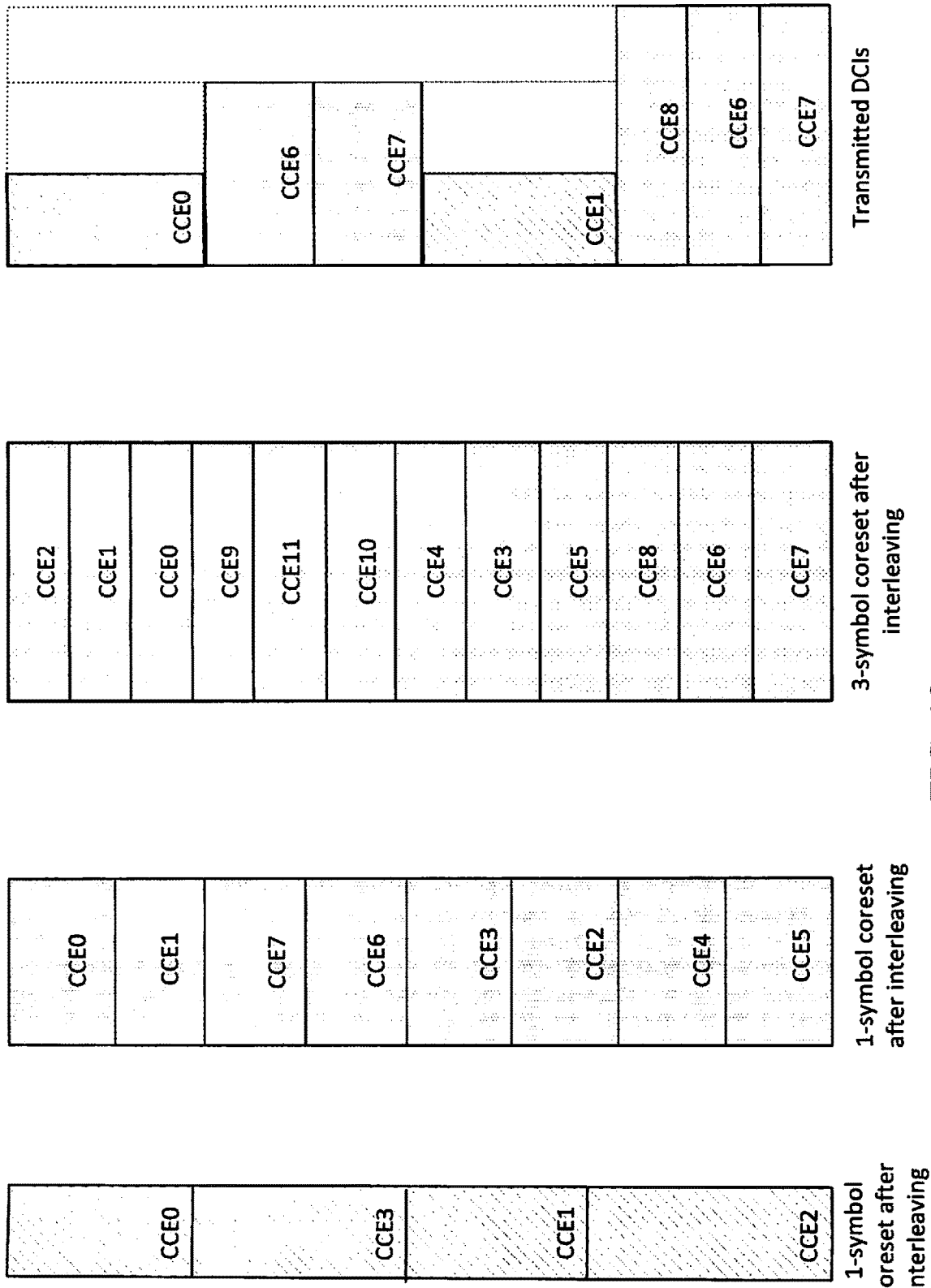
FIG. 13 illustrates an example of using equal size frequency block interleaving design for overlapping CORESETs of different lengths, with frequency interleaving within the blocks of frequency resources, in accordance with certain aspects of the present disclosure.

It may be desirable to randomize interference. According to certain aspects, a second level of permutation may be applied to randomize within the interleaving unit. In other words, within the interleaved same size blocks of frequency resources, further interleaving may be used for the CCEs within that block, for example, as shown in FIG. 13. The interleaving within the blocks may pseudo-random as a function of time (e.g., SFN and slot), cell ID, and interleaving unit index within the CORESETs.

Advantageously, techniques provided herein may enable an apparatus (e.g., a base station, such as a NodeB, gNB, etc.) to reduce the level of "blocking" associated with using overlapping CORESETs of different lengths, which may improve packing efficiency. In addition, further interleaving may randomize interference.

Example Multi-Step Interleaver Design for Efficient Coreset Overlapping

As discussed above, control resource sets (CORESETs) may be overlapping and CORESETs of different lengths (e.g., different numbers of symbols) may be overlapping. As discussed above, while supporting the coexistence of CORESETs of different lengths and may provide the base station with flexibility in allocating control resources, doing so may lead to blocking situations in which one or more control channel resources become unusable. When overlapping CORESETs are configured and unrestricted interleavings are applied to different CORESETs, it is possible to have many inter-CORESET blocking. For example, one aggregation level 1 (AL1) decoding candidate in a 1-symbol CORESET with a two-resource block (RB) size REG bundle may block multiple downlink control information (DCI) transmissions in the 2-symbol or 3-symbol CORESET, as discussed above.

One way to improve the inter-CORESET blocking is to introduce some commonality in the interleaver design for different length CORESETs. The basic idea is to align the interleaving for different length CORESETs (assume they are using the same set of RBs), so a DCI in one CORESET will block fewer DCIs in other CORESETs. Techniques described above provide interleaver design for mapping of resource elements groups (REGs) to physical resources for overlapping CORESETs of different symbol lengths. In one example, a common interleaving is used for different CORE-SETs of different lengths. The interleaving design may provide frequency diversity and interference randomization.

Aspects of the present disclosure provide a multi-step step interleaver design for efficient CORESETs overlapping. In some scenarios, the design may be a two-step design. And overlapping may involve, for example, overlapping CORE-SETs of different lengths and distributed search spaces. The two step interleaver design may further improve frequency diversity to help reduce blocking. Frequency diversity is improved at least by avoiding misaligned interleaving across different CORESETs with different lengths.

Figure 14:
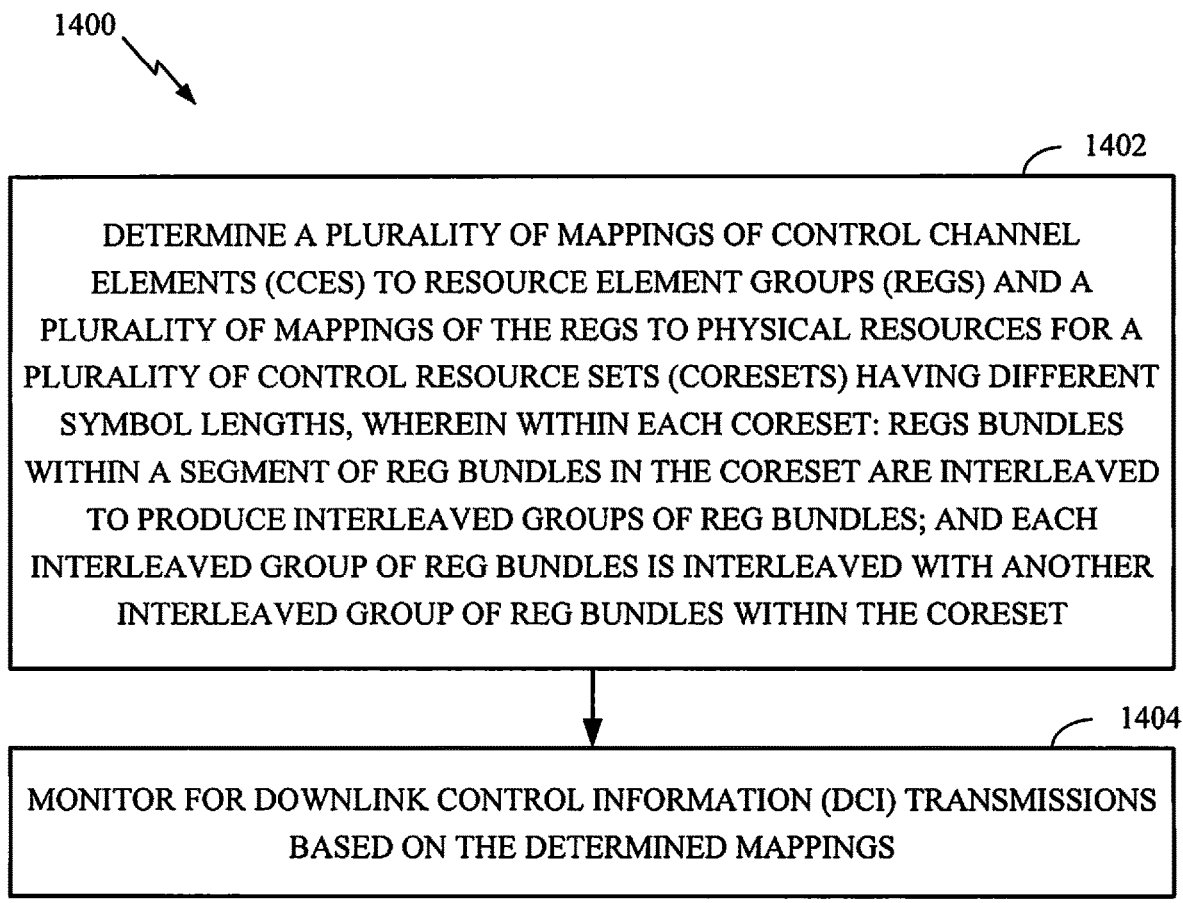
FIG. 14 illustrates example operations for wireless communications performed by a BS for a two-step interleaving design for overlapping CORESETs of different length, in accordance with certain aspects of the present disclosure.

FIG. 14 illustrates example operations 1400 for wireless communications, in accordance with aspects of the present disclosure. Operations 1400 may be performed by a UE, for example, UE 120, shown in FIG. 1.

Operations 1400 begin, at block 1402, by determining a plurality of mappings of CCEs to REGs and a plurality of mappings of the REGs to physical resources for a plurality of CORESETs having different symbol lengths. Within each CORESET REGs bundles within a segment of REG bundles in the CORESET are interleaved to produce interleaved groups of REG bundles (e.g., each group having an equal number of REG bundles). The interleaving within the segment may be a random permutation based a cell ID, slot index, segment index, and/or CORESET length. A different interleaving/permutation may be used for different length CORESETs.

Each interleaved group of REG bundles is interleaved with another interleaved group of REG bundles within the CORESET. The same interleaving pattern may be applied to the interleaved groups of REG bundles in the plurality of CORESETs. The interleaving of the interleaved groups of REG bundles comprises a random permutation based on a cell ID and/or a slot index. At 1404, the UE monitors for DCI transmissions based on the determined mappings.

The segment of REG bundles (e.g., 12 RBs) includes multiple CCEs and the first interleaving step results in REGs within a same CCE in different interleaved groups of REG bundles (blocks). Thus, when the different groups of REG bundles are interleaved across the entire CORESET in the second step, the CCEs of the same block may be far apart.

The size the segment of REG bundles corresponds an integer number of REG bundles for each of the plurality of CORESETs. In other words, since the different length CORESETs support different REG bundle sizes for interleaving, the size of the segment should be selected such that there are an integer number of REGs for any of the different CORESETs involved.

Figure 15:
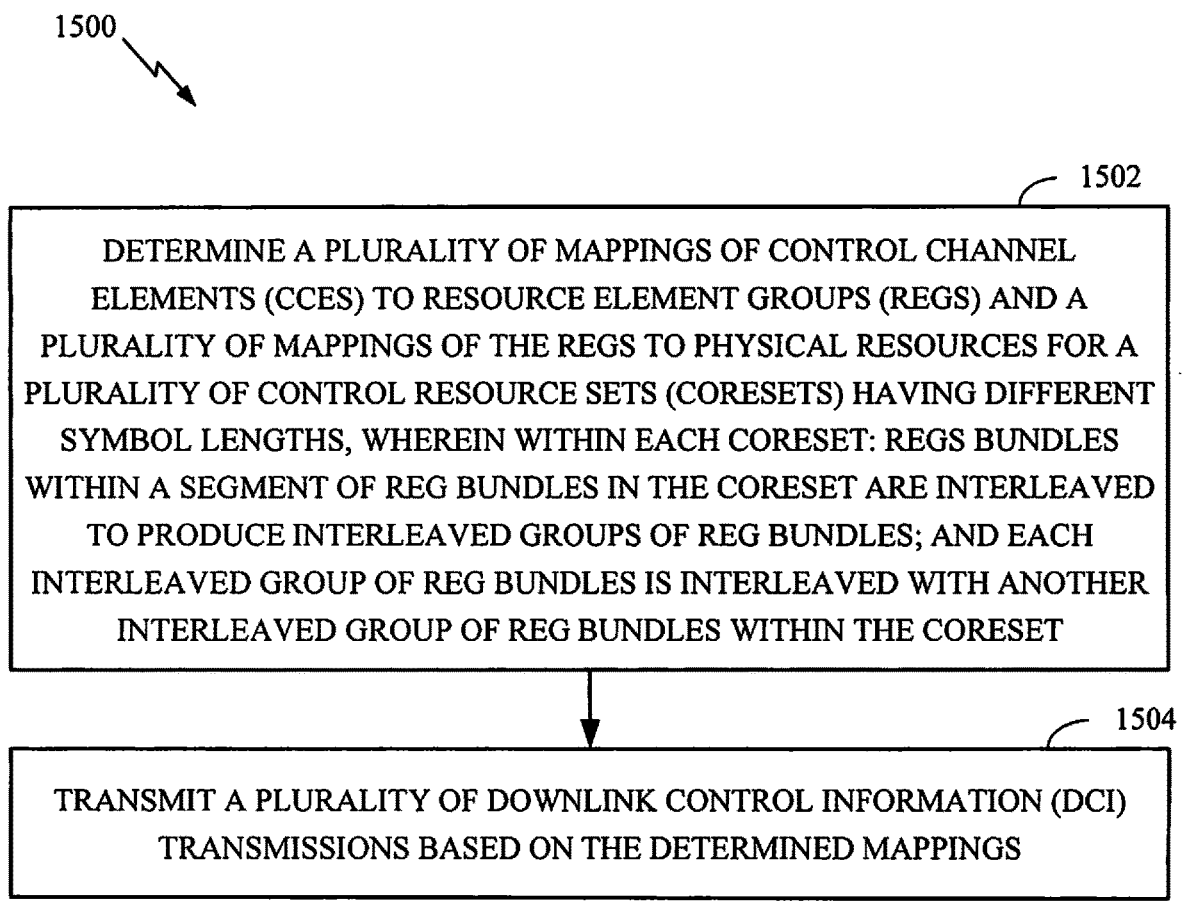
FIG. 15 illustrates example operations for wireless communications performed by a UE for a two-step interleaving design for overlapping CORESETs of different length, in accordance with certain aspects of the present disclosure.

FIG. 15 illustrates example operations 1500 for wireless communications, in accordance with aspects of the present disclosure. Operations 1500 may be performed by a UE, for example, UE 120, shown in FIG. 1. Operations 1500 may be complementary operations by the UE to the operations 1400 performed by the BS.

Operations 1500 begin, at block 1502, by determining a plurality of mappings of CCEs to REGs and a plurality of mappings of the REGs to physical resources for a plurality of CORESETs having different symbol lengths. Within each CORESET REGs bundles within a segment of REG bundles in the CORESET are interleaved to produce interleaved groups of REG bundles and each interleaved group of REG bundles is interleaved with another interleaved group of REG bundles within the CORESET. At 1504, the BS transmits a plurality of DCI transmissions based on the determined mappings.

CORESETs interleaving may be performed in units of REG bundles. The size of the REG bundle may be based on the CORESET length. For example, the REG bundle size may be 2 RBs or 6 RBs for the 1-symbol CORESET; 1 RB or 3 RBs for the 2-symbol CORESET; and 1 RB or 2 RBs for the 3-symbol CORESET.

Figure 16:
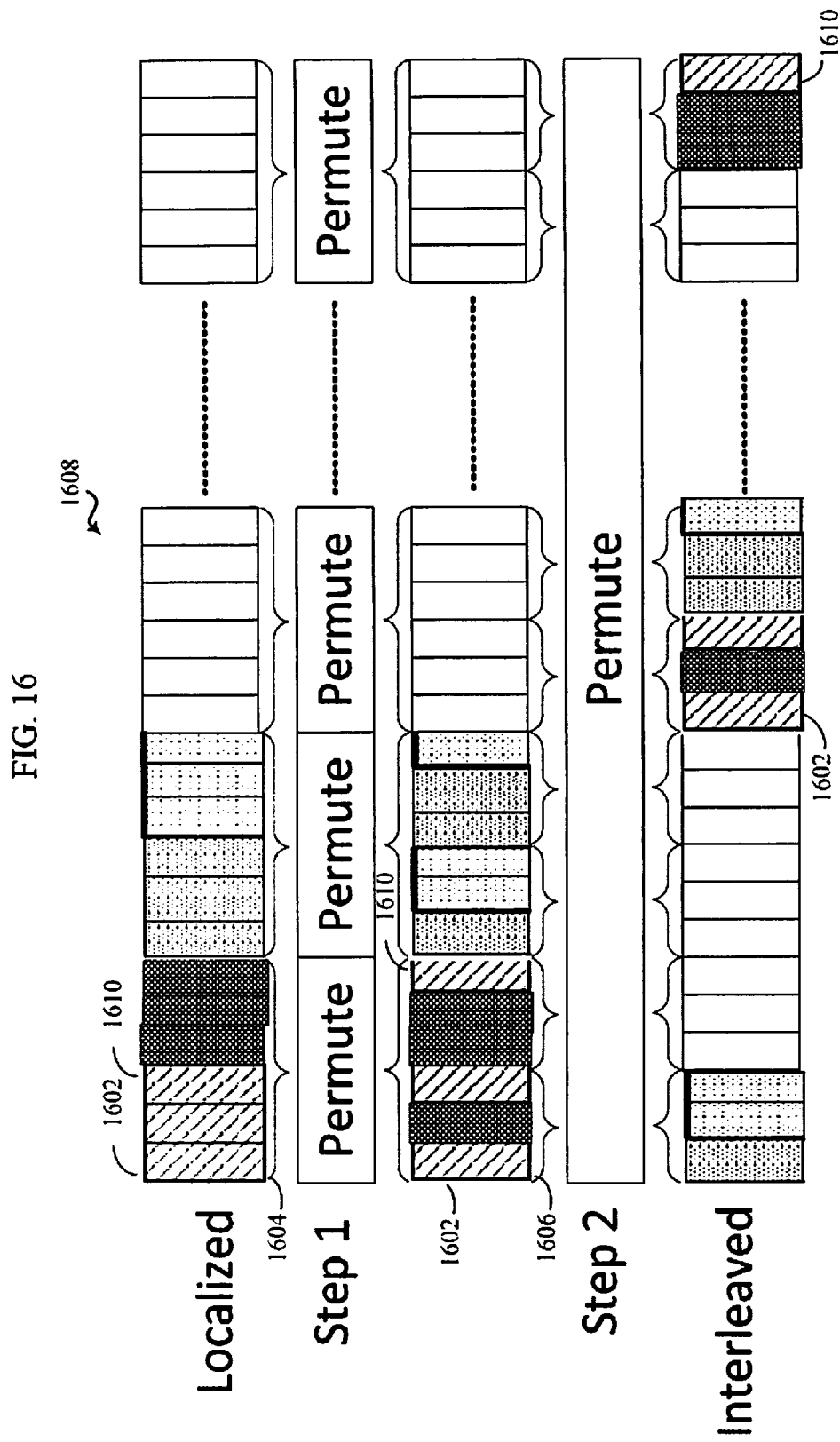
FIG. 16 illustrates an example of using a two-step interleaving design for overlapping CORESETs of different lengths, with frequency interleaving a resource element group (REG) bundle and frequency interleaving of groups of interleaved REG bundles within the CORESET, in accordance with certain aspects of the present disclosure.

FIG. 16 illustrates one example of using a multi-step (e.g., two-step) interleaving design for overlapping CORESETs of different lengths, with frequency interleaving a REG bundle and frequency interleaving of groups of interleaved REG bundles within the CORESET, in accordance with certain aspects of the present disclosure. In FIG. 16, the minimum allocation unit for a CORESET is one REG bundle 1602. In the example shown in FIG. 16, each REG bundle 1602 is 2 RBs. A REG bundle is the minimum interleaving unit. Once CCE is 3 REG bundles (6 RBs).

As shown in FIG. 16, in the step 1 permutation, REG bundles in a segment/group of REG bundles 1604 are interleaved locally. As shown in FIG. 1, REG bundles from one CCE are interleaved with REG bundles of another CCE in the segment/group 1604. The step 1 interleaving results in the interleaved groups of REG bundles 1606 (the different groups 1606 having different REG bundles from a same CCE). A permutation/interleaving may be applied for each segment/group 1604 of the CORESET 1608.

As shown in FIG. 16, in the step 2 of the interleaving, the interleaved groups of REG bundles 1606 are interleaved across the entire CORESET 1608. In other words, for second step of the interleaving, the interleaved groups of REG bundles 1606 are the unit interleaving size. Thus, since the first step of the interleaving resulted in a REG bundle 1602 from the same CCE as another REG bundle 1610 in different groups of REG bundles 1602, after the second step of the interleaving the REG bundle 1602 and the REG bundle 1610 may be far apart.

The two step interleaver design may ensure that the resources allocated for one CORESET blocks only a small number of resource allocated for another overlapping CORESET, yet still guarantee that even AL1 has some frequency diversity. The per-segment permutation in step 1 of the interleaving provides interference randomization and may distribute the REG bundles within the same CCE (e.g. the size 2 REG bundles in a 6 RB CCE in a 1-symbol CORESET) to different blocks, so they may be permuted far away in step 2. Step 2 of the interleaving may avoid misaligned interleaving across different CORESETs with different lengths. In this way, the blocking may be localized.

Multi-step interleaving may be extended to include any number of interleaving steps, as desired. For example, step 1, discussed above, may be segmented into multiple sub-steps and/or repeated any number of times according to any desired order. Further, step 2, disclosed above, may be segmented into multiple sub-steps and/or repeated any number of times according to any desired order. Additional interleave groups of REG bundles may be defined and interleaved across additional CORESETs. REG bundles from still more CCEs may be interleaved with REG bundles of additional CORESET, as is desired.

In embodiments, multi-component interleaving distributes REG bundles of a PDCCH in a manner that achieves both diversity and randomization. Diversity involves communicating via more than one source. If data from one source is lost in communication, the same data from another source may successfully transmit. As a result, diversity improves throughput of the REG bundles by minimizing the effect of signal path loss. Randomization involves spreading transmissions over carriers in order to randomize possible interference scenarios, for example, interferences caused by transmissions of neighboring cells. Randomization improves throughput by minimizing collisions between neighboring cells. An interleaving scheme that includes a diversity component and a randomization component better handles complex interference issues as compared to traditional interleaving techniques.

In embodiments, multi-component interleaving may be achieved via a multi-stage interleaving process that includes two or more interleave stages. For example, multi-stage interleaving may be a two-stage interleaver. For instances, diversity may be achieved in a first-stage (e.g., first interleaving), while randomization may be achieved in a second-stage (e.g., second interleaving). Further, a first-stage may utilize the same first interleaver for many and/or all cells of a group of cells (e.g., a network operator's cells), while a second-stage may be localized and use a second interleaver that is specific for one or more cell of a group of neighboring cells.

In examples, the first-stage of a two-stage interleaver may distribute the REG bundles of a PDCCH over the bandwidth of the CCE. The physical location of REG bundles of a PDCCH may be interleaved to improve throughput. For example, the REG bundles of a PDCCH may be interleaved to minimize the impact of an error burst occurring during transmission of the PDCCH. An example distribution scheme that improves throughput is distribution that increases or maximizes diversity.

Various versions of interleaving may be used in this first-stage, for example, block interleaving. In embodiments, any number of blocks may be selected to perform block interleaving, such as but not limited to, two blocks, three blocks, four blocks, six blocks, and/or the like.

In embodiments, the number of blocks selected to perform the first-stage interleaving may be dependent on the number of REGs within a REG bundle. For example, if the number of REGs within the REG bundle being interleaved is two REGs, then the first-stage interleaver may select three blocks to perform the interleaver, and/or the first-stage interleaver may select six blocks to perform the interleaver. Such an arrangement may achieve a diversity level of three. In another example, if the number of REGs within the REG bundle being interleaved is three REGs, then the first-stage interleaver may select two blocks to perform the interleaver, and/or the first-stage interleaver may select four blocks to perform the interleaver. Such an arrangement may achieve a diversity level of two. In yet another example, if the number of REGs within the REG bundle being interleaved is six REGs, then the first-stage interleaver may select two blocks to perform the interleaver, and/or the first-stage interleaver may select four blocks to perform the interleaver. That being said, when the number of REGs within the REG bundle is six, an interleaver may operate on an AL2 or an AL4 level in order to ensure diversity. Such an arrangement may achieve a diversity level of 2.

Figure 17A:
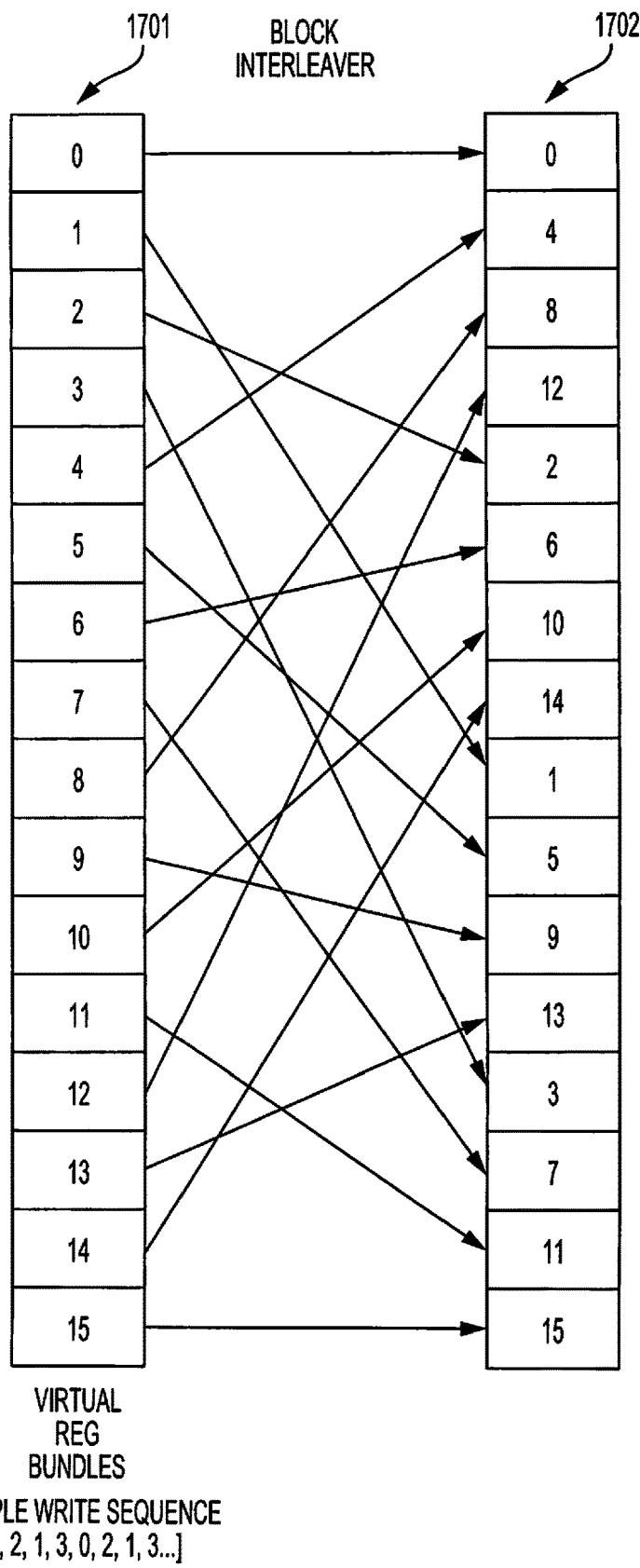
FIG. 17A is a block diagram, illustrating details of a wireless communication system according to some embodiments of the present disclosure.

FIG. 17A shows an example four block interleaver having an example writing sequence of [0,2,1,3,0,2,1,3, . . . ]. The original virtual order of the REG bundles 1701 are interleaved according to the writing sequence and output in the resulting order of the REG bundles 1702. The original virtual order of the REG bundles 1701 may be considered a first-stage input sequence and the resulting order of the REG bundles 1702 may be considered a first-stage output sequence. Other writing sequences may be utilized, including by not limited to: for 2 blocks, write sequence [0,1,0,1 . . . ]; for 3 blocks, write sequence [0,1,2,0,1, 2, . . . ]; for 4 blocks, write sequence [0,1,2,3,0,1,2,1, 3, . . . ] (as is shown in FIG. 4); and/or for 6 blocks, write sequence [0,2,4,1,3,5,0,2,4,1,3,5, . . . ]. Still further writing sequences may be used as is desired to achieve a specific level of diversity and/or the like.

The first-stage of the multi-stage interleaving provides increased diversity as compared to the original virtual REG bundles sequence 1701. By increasing the diversity of the sequence, increased throughput is achieved because an error burst will have less impact on a REG bundle. That being said, if neighboring cells perform the same interleaver on the same block of REG bundles, then the neighboring cells may cause persistent collisions. Further, the distance between neighboring cells is growing smaller and smaller; as such, the likelihood of such interference is growing. Adding another component of interleaving to the REG bundles within a block improves this technical problem. In embodiments, the other component may be a randomization component. In an example multi-stage interleaver, the second-stage may perform a randomization interleaver.

In embodiments, a second-stage interleaving may be performed to randomize the results of the first-stage interleaving. The second-stage interleaving may be performed locally at a cell and/or for a specific cell. The second-stage interleaver of a first cell may be different from a second-stage interleaver of a second cell. At this second-stage, having a different interleaver for a first cell as compared to a neighboring second cell avoids persistent collision and reduces interference.

Various versions of interleaving may be used in this second-stage, for example, randomized interleaving. In embodiments, the second-stage interleaver may be a random intrablock interleaver that randomizes the REG bundle locations within a block produced in the first-stage (e.g., intrablock randomization). In embodiments, a random seed may be used by the randomizing interleaver. In an example, a random seed may be a function of a cell index, time, a control resource set index, a first interleaver block index, system frame number, symbol index, REG bundle index, block index, and/or additional parameters, if desired, for example, the bandwidth and a center frequency of the REG bundles. Various different randomizing interleavers may use different random seeds to make the randomizing interleaver different from one another.

Figure 17B:
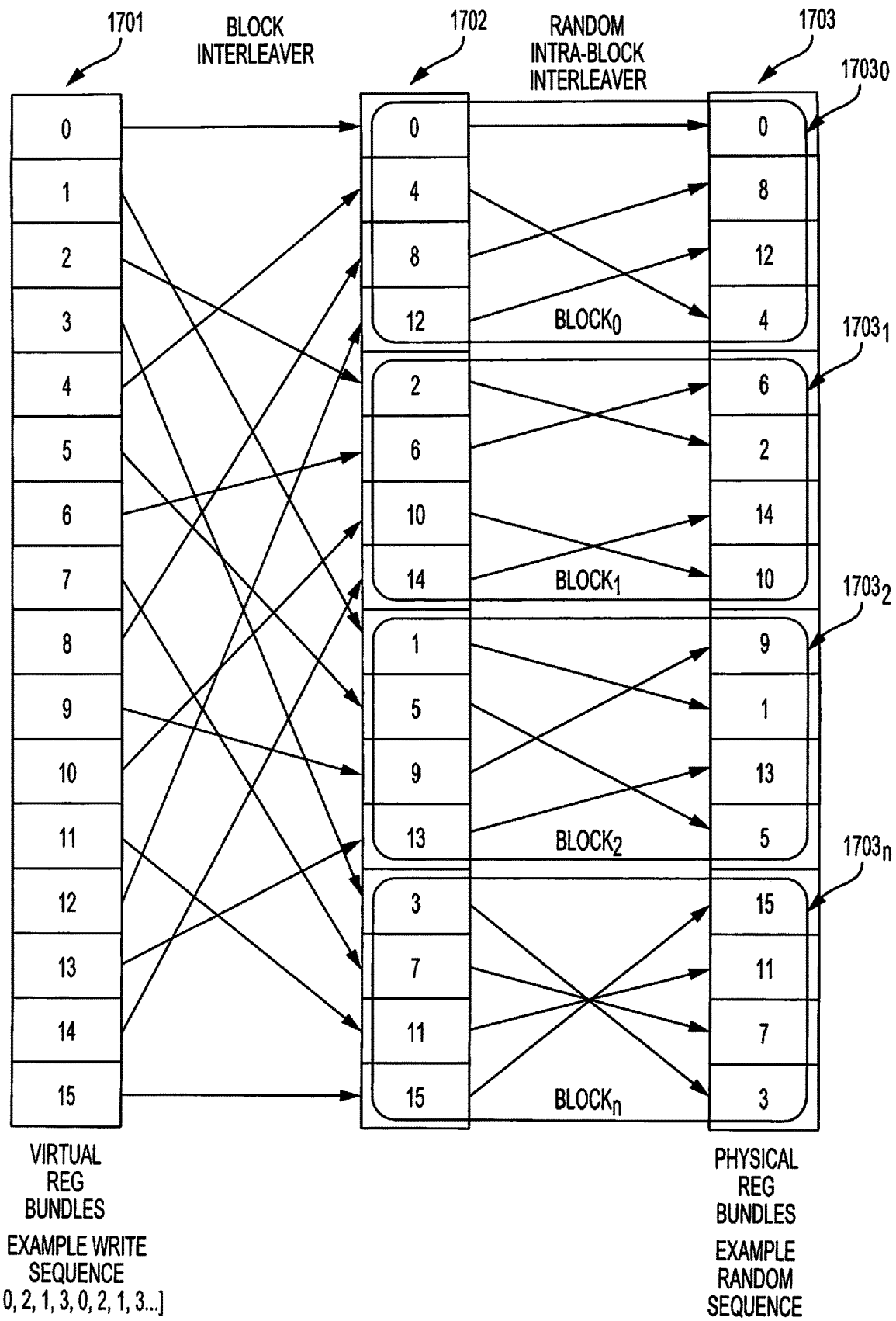
FIG. 17B is a block diagram, illustrating details of a wireless communication system according to some embodiments of the present disclosure.

FIG. 17B shows an example of randomizing REG bundle locations within a block produced by the first-stage interleaver. In this example, the first-stage utilized a four block interleaver having an example writing sequence of [0,2,1, 3,0,2,1,3, . . . ]. The original virtual order of the REG bundles 1701 are interleaved according to the writing sequence and result-in the resulting order of the REG bundles 1702. The original virtual order of the REG bundles 1701 may be considered a first-stage input sequence and resulting order of the REG bundles 1702 may be considered a first-stage output sequence. The first-stage output sequence 1702 may be used as the second-stage input sequence. In examples, the second-stage interleaver randomizes the sequence 1702 within the respective blocks of the first-stage output sequence 1702. For instance, the second-stage interleaver randomizes the sequence within a first block (e.g., block$_0$ of the first-stage output sequence 1702, which results in second-stage block output 1703a. The second-stage interleaver randomizes the sequence within a second block (e.g., block$_1$) of the first-stage output sequence 1702, which results in second-stage block output 17017B. The second-stage interleaver randomizes the sequence within a third block (e.g., block$_2$) of the first-stage output sequence 1702, which results in second-stage block output 1703c. The second-stage interleaver randomizes the sequence within an nth block (e.g., block₃) of the first-stage output sequence 1702, which results in second-stage block output 1703n. Second-stage block outputs (e.g., 1703a-1703n) collectively make up the second-stage output sequence 1703. The second-stage output sequence 1703 is the physical channel sequence of the REG bundles. The REG bundles are transmitted within a PDCCH according to the physical channel sequence of the REG bundles.

Figure 18:
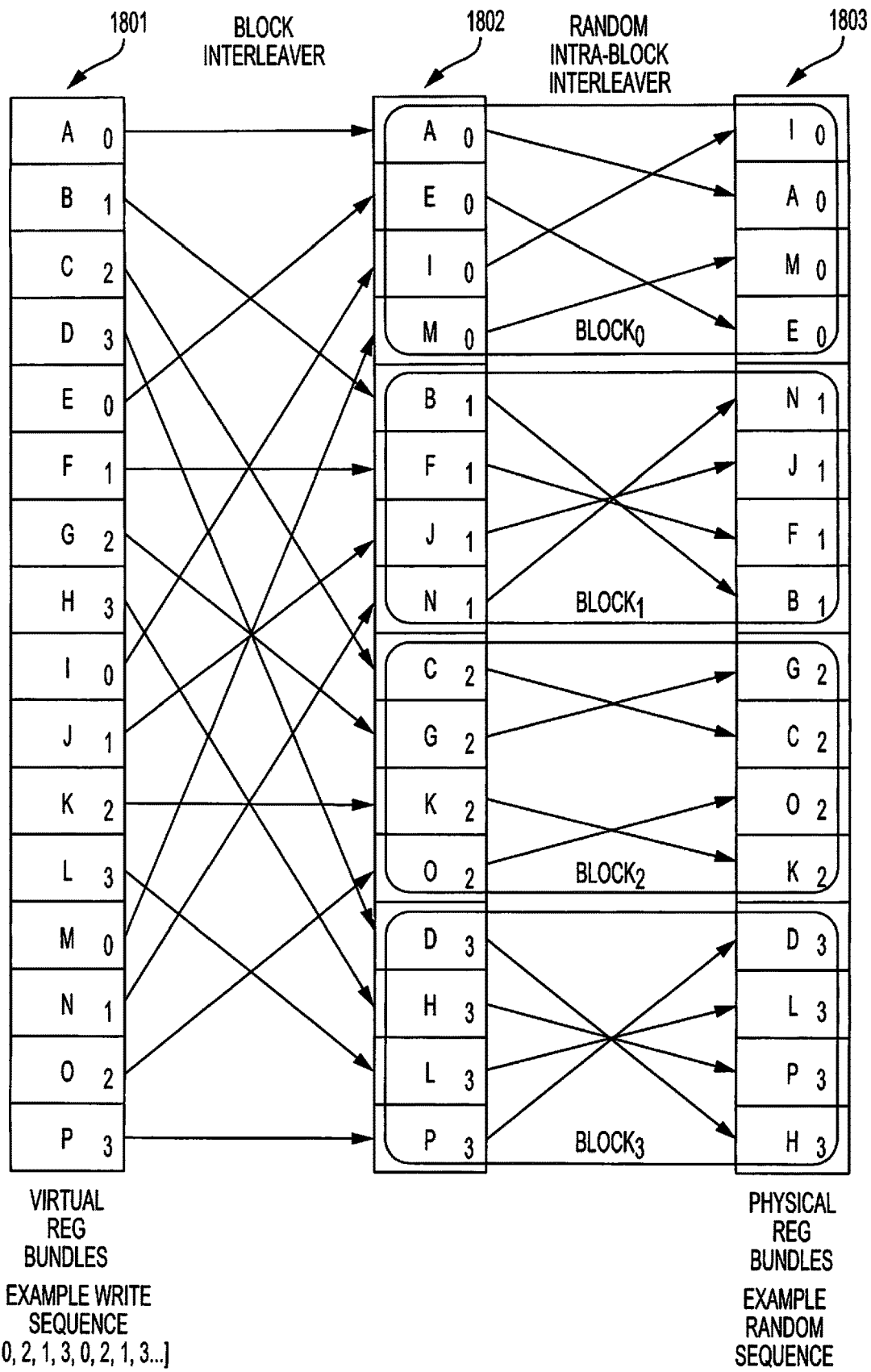
FIG. 18 is a block diagram, illustrating details of a wireless communication system according to some embodiments of the present disclosure.

The second-stage output sequence 1703 includes a diversity component and a randomization component. Having a multi-component interleaved sequence increases the REG bundles' throughput as well as avoids collisions during transmission. FIG. 18 shows another example multi-component interleaving process. The example of FIG. 18 has a four block interleaver with a writing sequence of [0,1,2,3, 0,1,2,3 . . . ] and uses a different randomizer interleaver as compared to FIG. 17B. FIG. 18 takes example virtual REG bundles 1801, interleaves them producing output 1802, and interleaves output 1802 into second output 1803.

Figure 19:
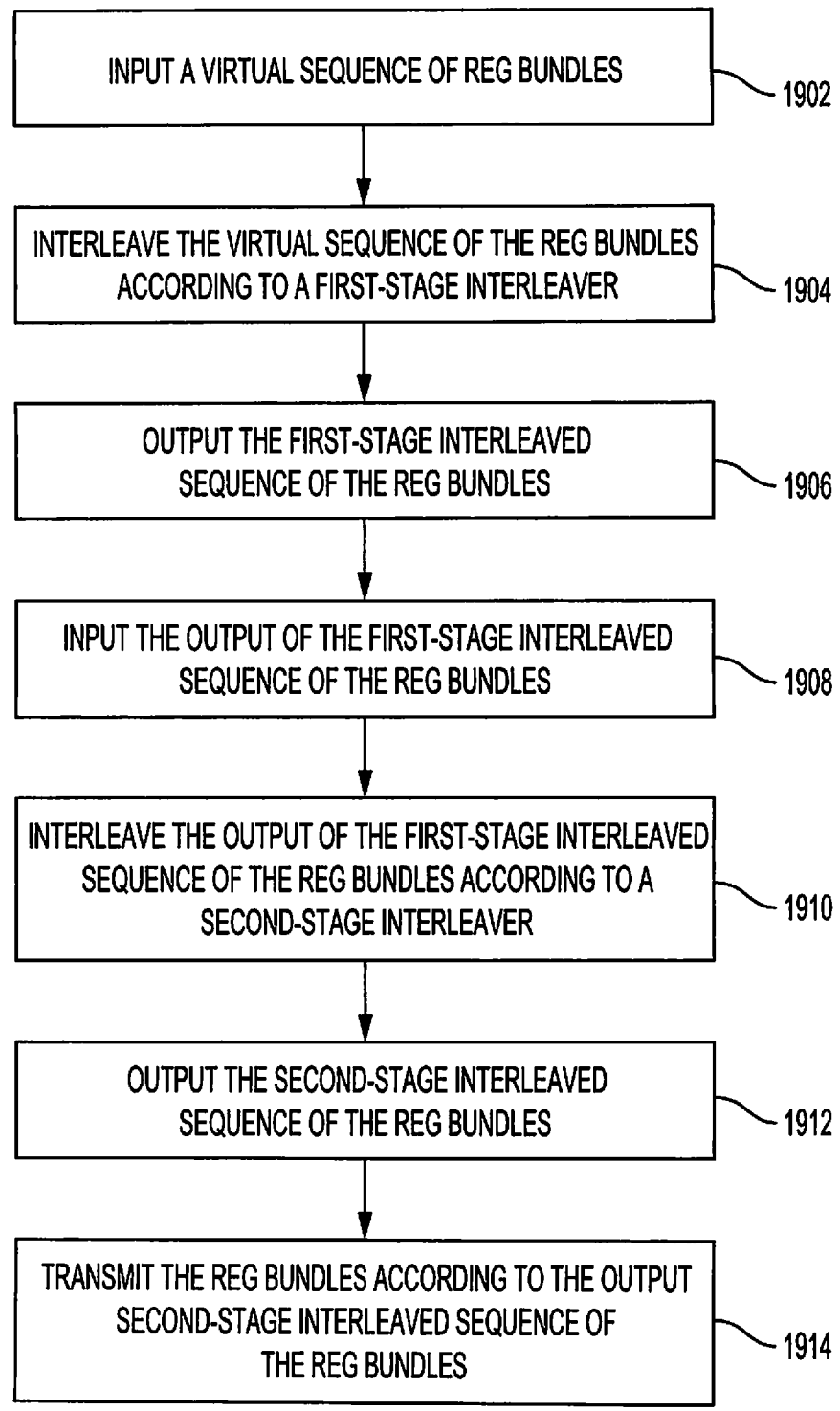
FIG. 19 is an example process according to some embodiments of the present disclosure.

FIG. 19 shows an example method 1900 of performing a multi-component interleaving process. In this example process 1900, the multi-component process is performed in two stages, but one stage and/or more stages may be used to perform a multi-component interleaving process and generate a multi-component interleaved output sequence. In step 1902, one or more processor (e.g., at a base station) inputs a virtual sequence of REG bundles into a first-stage interleaver. In step 1904, the first-stage interleaver interleaves the virtual sequence of the REG bundles. In step 1906, the first-stage interleaver outputs the first-stage interleaved sequence of the REG bundles. In step 1908, one or more processor inputs the output of the first-stage interleaved sequence of REG bundles 1908 into a second stage interleaver. In step 1910, the second-stage interleaver interleaves the output of the first-stage interleaved sequence of the REG bundles. In step 1912, the second-stage interleaver outputs the second-stage interleaved sequence of the REG bundles. The output of the second-stage interleaver is a multi-component interleaved sequence. In step 1914, a transmitter transmits the multi-component interleaved REG bundles.

In embodiments, the first-stage interleaver may provide diversity. For instance, the first-stage interleaver may be a block interleaver. In embodiments, the second-stage interleaver may minimize transmission collisions. For instance, the second-stage interleaver may be a randomizing interleaver. In examples, the randomizer interleaver may randomize REG bundles within the output blocks of the block interleaver. If desired, process 1900 may include one or more further interleavers that further interleave the output of steps 1906 and/or 1912 prior to performing step 1914, which transmits the REG bundles.

FIG. 20 shows another example method 2000 of performing a multi-component interleaving process. In example process 2000, various steps performed by various processors of a cell (e.g., base stations), may occur before, during, and/or after one another. In this example, at step 2002a, one or more processor, at a first cell, interleaves a sequence of REG bundles according to a first-stage interleaver. At step 2004a, the first-stage interleaved sequence of the REG bundles is output. At step 2006a, the output of step 2004a is input into a second-stage interleaver that is specified for the first cell. At step 2008a, the one or more processor, of the first cell, interleaves the output of the first-stage interleaved sequence of the REG bundles according to a second-stage interleaver specified for the first cell. At step 2010a, the second-stage interleaved sequence of the REG bundles of the first cell is output. At step 2012a, a transmitter of the first cell transmits the REG bundles according to the output second-stage interleaved sequence of the REG bundles (e.g., the output of step 2010a). If desired, process 2000 may include one or more further interleavers that further interleave the output of steps 2004a and/or 2010a prior to performing step 2012a, which transmits the REG bundles.

Before, during, or after steps 2002a-2012a, steps 2002b-2012b are performed at a second cell. In this example, at step 2002b, one or more processor, at the second cell, interleaves a sequence of REG bundles according to a first-stage interleaver. At step 2004b, the first-stage interleaved sequence of the REG bundles is output. At step 2006b, the output of step 2004b is input into a second-stage interleaver that is specified for the second cell. At step 2008b, the one or more processor, of the second cell, interleaves the output of the first-stage interleaved sequence of the REG bundles according to a second-stage interleaver specified for the second cell. At step 2010b, the second-stage interleaved sequence of the REG bundles of the second cell is output. At step 2012b, a transmitter of the second cell transmits the REG bundles according to the output second-stage interleaved sequence of the REG bundles (e.g., the output of step 2010b). If desired, process 2000 may include one or more further interleavers that further interleave the output of steps 2004b and/or 2010b prior to performing step 2012b, which transmits the REG bundles.

Before, during, or after steps 2002b-2012b, steps 2002n-2012n are performed at an nth cell. In this example, at step 2002n, one or more processor, at the nth cell, interleaves a sequence of REG bundles according to a first-stage interleaver. At step 2004n, the first-stage interleaved sequence of the REG bundles is output. At step 2006n, the output of step 2004n is input into a second-stage interleaver that is specified for the nth cell. At step 2008n, the one or more processor, of the nth cell, interleaves the output of the first-stage interleaved sequence of the REG bundles according to a second-stage interleaver specified for the nth cell. At step 2010n, the second-stage interleaved sequence of the REG bundles of the nth cell is output. At step 2012n, a transmitter of the nth cell transmits the REG bundles according to the output second-stage interleaved sequence of the REG bundles (e.g., the output of step 2010n). If desired, process 2000 may include one or more further interleavers that further interleave the output of steps 2004n and/or 2010n prior to performing step 2012n, which transmits the REG bundles.

In embodiments, the first-stage interleaver may provide diversity. For instance, the first-stage interleaver may be a block interleaver. In embodiment, the first-stage interleaver may be the same for all cells and/or a group of cells (e.g., cells of a common network operator, cells of a common area, and/or the like). Further, the first-stage interleaver may be different for all cells and/or a group of cells (e.g., cells of a common network operator, cells of a common area, and/or the like). Further still, the first-stage interleaver may be a diversity interleaver (e.g., block interleaver), a randomizing interleaver, and/or the like.

In embodiments, the second-stage interleaver may minimize transmission collisions. For instance, the second-stage interleaver may be a randomizing interleaver. In examples, the randomizer interleaver may randomize REG bundles within the output blocks of the block interleaver. In embodiments, the second-stage interleaver may be different for all cells and/or a group of cells (e.g., cells of a common network operator, cells of a common area, and/or the like). Further, the second-stage interleaver may be the same for all cells and/or a group of cells (e.g., cells of a common network operator, cells of a common area, and/or the like). Further still, the second-stage interleaver may be a diversity interleaver (e.g., block interleaver), a randomizing interleaver, and/or the like.

In embodiments, one or more nth-stage interleaver may be utilized to improve throughput of the REG bundles. In examples, one or more nth-stage interleaver may be utilized before the first-stage interleaver, after the first-stage interleaver, before the second-stage interleaver, and/or after the second-stage interleaver. One or more nth-stage interleaver may be a diversity interleaver (e.g., block interleaver), a randomizing interleaver, and/or the like. In examples, one or more nth-stage interleaver may interleave the REG bundles within the output blocks of a previous interleaver of the process/system. In the case of a nth-stage block interleaver, the writing scheme writing sequence may be the same and/or different from other interleavers of the process/system. In the case of a nth-stage randomization interleaver, the random seed may be the same and/or different from other interleavers of the process/system. In the case of another type of interleaver, the type and manner of interleaving may be the same and/or different from other interleavers of the process/system. In embodiments, the nth-stage interleaver may be different for all cells and/or a group of cells (e.g., cells of a common network operator, cells of a common area, and/or the like). Further, the nth-stage interleaver may be the same for all cells and/or a group of cells (e.g., cells of a common network operator, cells of a common area, and/or the like). Any number of nth-stage interleavers may be used as is desired. Any interleaver of any nth-stage interleaver may be performed in a different stage and/or in the same stage as the first-stage interleaver, which may be performed in a different stage and/or in the same stage as the second-stage interleaver.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 10, 11, 14, 15, 19, and 20 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
   determining, by a processor, a plurality of mappings of control channel elements (CCEs) to physical resources for a plurality of control resource sets (CORESETs) having different symbol lengths, wherein at least one mapping of the plurality of mappings provides multi-stage interleaving including a first stage interleaving providing a diversity component and a second stage interleaving providing a randomization component; and
   transmitting, by one or more antenna, a plurality of downlink control information (DCI) transmissions based on the determined plurality of mappings.

2. The method of claim 1, wherein the CCEs are mapped to resource element groups (REGs) and the REGs are mapped to the physical resources.

3. The method of claim 1, further comprising:
   performing the multi-component interleaving on a sequence of REG bundles of a CORESET of the plurality of CORESETs.

4. The method of claim 3, wherein the performing the multi-component interleaving comprises:
   interleaving equal sized blocks of frequency resources for the plurality of CORESETs;
   interleaving REGs bundles within a segment of REG bundles in the CORESET to produce interleaved groups of REG bundles; and
   interleaving respective interleaved groups of REG bundles with another interleaved group of REG bundles within the CORESET.

5. The method of claim 3, wherein the diversity component is provided by a block interleaver, and where a number of blocks utilized by the block interleaver is dependent on at least one of:
   a number of REGs in respective REG bundles, and
   matches a plurality of neighboring cells.

6. The method of claim 3, wherein:
   each segment of REG bundles comprises at least two CCEs, and
   at least one REG bundle from each CCE is in a different interleaved group of REG bundles than another REG bundle from that CCE.

7. The method of claim 3, wherein the randomization component is a function of a random seed, wherein the random seed of a first cell is different from the random seed of a second cell, and wherein the first cell is a neighboring cell of the second cell.

8. The method of claim 3, wherein the randomizing component is a function of a random seed comprising:
   a cell index;
   time;
   a control resource set index; and
   a first interleaver block index.

9. A non-transitory computer-readable medium having program code recorded thereon, which when executed causes a processor to perform wireless communication operations, the program code comprising:
   code for determining, by a processor, a plurality of mappings of control channel elements (CCEs) to physical resources for a plurality of control resource sets (CORESETs) having different symbol lengths, wherein at least one mapping of the plurality of mappings provides multi-stage interleaving including a first stage interleaving providing a diversity component and a second stage interleaving providing a randomization component; and
   code for transmitting, by one or more antenna, a plurality of downlink control information (DCI) transmissions based on the determined plurality of mappings.

10. The non-transitory computer-readable medium of claim 9, wherein the CCEs are mapped to resource element groups (REGs) and the REGs are mapped to the physical resources.

11. The non-transitory computer-readable medium of claim 9, further comprising:
   code for performing the multi-component interleaving on a sequence of REG bundles of a CORESET of the plurality of CORESETs.

12. The non-transitory computer-readable medium of claim 11, wherein the code for performing the multi-component interleaving comprises:
   code for interleaving equal sized blocks of frequency resources for the plurality of CORESETs;
   code for interleaving REGs bundles within a segment of REG bundles in the CORESET to produce interleaved groups of REG bundles; and
   code for interleaving respective interleaved groups of REG bundles with another interleaved group of REG bundles within the CORESET.

13. The non-transitory computer-readable medium of claim 11, wherein the diversity component is provided by a block interleaver, and where a number of blocks utilized by the block interleaver is dependent on at least one of:
   a number of REGs in respective REG bundles, and
   matches a plurality of neighboring cells.

14. The non-transitory computer-readable medium of claim 11, wherein,
   each segment of REG bundles comprises at least two CCEs, and
   at least one REG bundle from each CCE is in a different interleaved group of REG bundles than another REG bundle from that CCE.

15. The non-transitory computer-readable medium of claim 11, wherein the randomization component is a function of a random seed, and where the random seed of a first cell is different from the random seed of a second cell, and wherein the first cell is a neighboring cell of the second cell.

16. The non-transitory computer-readable medium of claim 11, wherein the randomization component is a function of a random seed comprising:
 a cell index;
 time;
 a control resource set index; and
 a first interleaver block index.

17. A system for wireless communications, comprising:
 a processor configured to:
  determine a plurality of mappings of control channel elements (CCEs) to physical resources for a plurality of control resource sets (CORESETs) having different symbol lengths, wherein mappings of the plurality of mappings provide multi-stage interleaving including a first stage interleaving providing a diversity component and a second stage interleaving providing a randomization component; and
  one or more antennas configured to transmit a plurality of downlink control information (DCI) transmissions based on the determined plurality of mappings.

18. The system of claim 17, wherein the CCEs are mapped to resource element groups (REGs) and the REGs are mapped to the physical resources.

19. The system of claim 17, wherein the processor further performs the multi-component interleaving on a sequence of REG bundles of a CORESET of the plurality of CORESETs.

20. The system of claim 19, wherein the multi-component interleaving comprises the processor interleaving equal sized blocks of frequency resources for the plurality of CORESETs, interleaving REGs bundles within a segment of REG bundles in the CORESET to produce interleaved groups of REG bundles, and interleaving respective interleaved groups of REG bundles with another interleaved group of REG bundles within the CORESET.

21. The system of claim 19, wherein the diversity component is provided by a block interleaver, and where a number of blocks utilized by the block interleaver is dependent on at least one of:
 a number of REGs in respective REG bundles, and
 matches a plurality of neighboring cells.

22. The system of claim 19, wherein
 each segment of REG bundles comprises at least two CCEs, and
 at least one REG bundle from each CCE is in a different interleaved group of REG bundles than another REG bundle from that CCE.

23. The system of claim 19, wherein the randomization component is a function of a random seed, wherein the random seed of a first cell is different from the random seed of a second cell, and wherein the first cell is a neighboring cell of the second cell.

24. The system of claim 19, wherein the randomizing component is a function of a random seed comprising:
 a cell index;
 time;
 a control resource set index; and
 a first interleaver block index.

* * * * *